(12) United States Patent
Deenoo et al.

(10) Patent No.: US 11,394,447 B2
(45) Date of Patent: Jul. 19, 2022

(54) METHODS AND APPARATUS FOR BEAM CONTROL IN BEAMFORMED SYSTEMS

(71) Applicant: IDAC HOLDINGS, INC., Wilmington, DE (US)

(72) Inventors: Yugeswar Deenoo, Chalfont, PA (US); Tao Deng, Roslyn, NY (US); Janet A. Stern-Berkowitz, Little Neck, NY (US); Moon-il Lee, Melville, NY (US); Mihaela C. Beluri, Jericho, NY (US); Ravikumar V. Pragada, Warrington, PA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/081,491

(22) PCT Filed: Mar. 2, 2017

(86) PCT No.: PCT/US2017/020384
§ 371 (c)(1),
(2) Date: Aug. 31, 2018

(87) PCT Pub. No.: WO2017/151876
PCT Pub. Date: Sep. 8, 2017

(65) Prior Publication Data
US 2019/0081688 A1  Mar. 14, 2019

Related U.S. Application Data

(60) Provisional application No. 62/302,962, filed on Mar. 3, 2016.

(51) Int. Cl.
*H04B 7/06* (2006.01)
*H04B 7/08* (2006.01)
*H04L 5/00* (2006.01)

(52) U.S. Cl.
CPC ........... *H04B 7/0695* (2013.01); *H04B 7/088* (2013.01); *H04L 5/005* (2013.01); *H04L 5/0023* (2013.01);
(Continued)

(58) Field of Classification Search
None
See application file for complete search history.

(56) References Cited

U.S. PATENT DOCUMENTS 6,055,230 A  4/2000 Feuerstein et al.
9,184,806 B2  11/2015 Kim et al.
(Continued)

FOREIGN PATENT DOCUMENTS

WO  2012/061770  5/2012
WO  2014139174 A1  9/2014
WO  2015195338 A1  12/2015

OTHER PUBLICATIONS

Interdigital Communications, "On Beam Management for DL Control and Data Channels," 3GPP TSG RAN WG1 Meeting #88bis, R1-1705505, Spokane, USA (Apr. 3-7, 2017).
(Continued)

*Primary Examiner* — Bob A Phunkulh
(74) *Attorney, Agent, or Firm* — Volpe Koenig

(57) ABSTRACT

Methods and apparatus are described. A method, implemented in a wireless transmit/receive unit (WTRU) includes monitoring a first control channel search space (SS) associated with a first normal beam set comprising a first beam set. The WTRU initiates extended monitoring and monitors, subsequent to a trigger based on a measurement by the WTRU, a control channel SS associated with an extended beam set comprising the first beam set and one or more additional beam sets. The WTRU determines a second beam set from the extended beam set. The determination is based
(Continued)

on a received control channel beam switch command or based on a control channel SS in which a beam switch command is received. The WTRU monitors a second control channel SS associated with a second normal beam set comprising the determined second beam set.

18 Claims, 16 Drawing Sheets

(52) U.S. Cl.
CPC .......... *H04L 5/0033* (2013.01); *H04L 5/0051* (2013.01); *H04L 5/0053* (2013.01); *H04L 5/0055* (2013.01); *H04L 5/0069* (2013.01)

(56) References Cited

U.S. PATENT DOCUMENTS

| | | | |
|---|---|---|---|
| 9,363,683 | B2 | 6/2016 | Raghavan et al. |
| 9,510,260 | B2 | 11/2016 | Yi et al. |
| 9,635,658 | B2 | 4/2017 | Papasakellariou et al. |
| 9,642,165 | B2 | 5/2017 | Jung et al. |
| 9,681,341 | B2 | 6/2017 | Ryu et al. |
| 9,699,779 | B2 | 7/2017 | Marinier et al. |
| 10,630,358 | B2 * | 4/2020 | Hakola ................. H04B 7/0617 |
| 2006/0264184 | A1 * | 11/2006 | Li ........................ H04B 7/0695 455/101 |
| 2011/0110453 | A1 * | 5/2011 | Prasad ................... H04B 7/088 375/285 |
| 2011/0273992 | A1 | 11/2011 | Zhang et al. |
| 2012/0157140 | A1 * | 6/2012 | Kim ....................... H04B 7/024 455/501 |
| 2013/0301434 | A1 | 11/2013 | Krishnamurthy et al. |
| 2014/0120926 | A1 * | 5/2014 | Shin ...................... H04W 48/12 455/450 |
| 2014/0177561 | A1 * | 6/2014 | Yu ........................ H04W 72/042 370/329 |
| 2014/0321282 | A1 | 10/2014 | Pragada et al. |
| 2014/0328277 | A1 | 11/2014 | Xiao et al. |
| 2014/0334564 | A1 | 11/2014 | Singh et al. |
| 2015/0236774 | A1 * | 8/2015 | Son ....................... H04B 7/0628 375/267 |
| 2016/0087765 | A1 * | 3/2016 | Guey ................... H04L 27/2607 370/330 |
| 2016/0093950 | A1 | 3/2016 | Cummings et al. |
| 2016/0212631 | A1 * | 7/2016 | Shen ..................... H04W 56/001 |
| 2016/0219570 | A1 * | 7/2016 | Guo ..................... H04W 72/042 |
| 2016/0241322 | A1 * | 8/2016 | Son ...................... H04W 72/046 |
| 2016/0262140 | A1 * | 9/2016 | Liu .................... H04W 72/0406 |
| 2017/0126296 | A1 * | 5/2017 | Molev Shteiman ... H04B 17/20 |
| 2017/0215127 | A1 * | 7/2017 | McGowan ............. H04B 7/0408 |
| 2017/0272223 | A1 * | 9/2017 | Kim ..................... H04B 7/0617 |
| 2017/0273062 | A1 * | 9/2017 | Liu ....................... H04B 7/0617 |
| 2018/0084446 | A1 * | 3/2018 | Li ......................... H04W 24/08 |
| 2018/0294860 | A1 * | 10/2018 | Hakola ................. H04W 48/16 |
| 2018/0351624 | A1 * | 12/2018 | Hakola ................. H04B 7/0617 |
| 2019/0075014 | A1 | 3/2019 | Zhou et al. |
| 2019/0081740 | A1 | 3/2019 | Kaikkonen et al. |

OTHER PUBLICATIONS

Almers et al., "Antenna Subset Selection in Measured Indoor Channels," Mitsubishi Electric Research Laboratories, TR2007-103 (Oct. 2008).
CMCC, "On Gradual UE-Specific (GUS) beamformed control channel," 3GPP TSG RAN WG1 Meeting #85, R1-164891, Nanjing, China (May 23-27, 2016).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancments for High Efficiency WLAN, IEEE P802.11ax/D0.1 (Mar. 2016).
Ericsson et al., "Principles for downlink control signaling in NR," TSG-RAN WG1 #85, R1-164624, Nanjing, China (May 23-27, 2016).
Intel corporation et al., "WF on DL beam management," 3GPP TSG RAN1 #86, R1-168278, Gothenburg, Sweden (Aug. 22-26, 2016).
LG et al., "WF on support of rotatable UE with beamforming in NR," 3GPP TSG RAN1 #86, R1-168308, Gothenburg, Sweden (Aug. 22-26, 2016).
Nokia et al., "Scalability of MIMO operation across NR carrier frequencies," 3GPP TSG-RAN WG1#85, R1-165363, Nanjing, P. R. China (May 23-27, 2016).
Stacey, "Specification Framework for TGax," IEEE P802.11 Wireless LANs, IEEE 802.11-17/0132r15 (May 25, 2016).† .
Stacey, "Specification Framework for TGax," IEEE P802.11 Wireless LANs, IEEE 802.11-15/0132r15 (Jan. 28, 2016).
Sur et al., "60 GHz Indoor Networking through Flexible Beams: A Link-Level Profiling," Proceedings of the 2015 ACM Sigmetrics International Conference on Measurement and Modeling of Computer Systems, Portland, Oregon, USA, pp. 71-84 (Jun. 15-19, 2015).
Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).
Third Generation Partnership Project, "Technical Specification Group Radio Access Network; Evolved Universal Terrestrial Radio Access (E-UTRA); Physical layer procedures (Release 13)," 3GPP TS 36.213 V13.0.1 (Jan. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.4.0 (Dec. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.1.0 (Dec. 2016).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).
Third Generation Partnership Project, "Technical Specification Group Radio Access Network; Evolved Universal Terrestrial Radio Access (E-UTRA); Physical channels and modulation (Release 12)," 3GPP TS 36.211 V13.0.0 (Dec. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V13.4.0 (Dec. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.1.0 (Dec. 2016).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.0.0 (Dec. 2015).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.4.0 (Dec. 2016).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.1.0 (Dec. 2016).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.0.0 (Jun. 2012).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.4.0 (Dec. 2016).

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.1.0 (Dec. 2016).

Wang et al., "Title," Int. J. Communications, Network and System Sciences, vol. 4, pp. 638-647 (Oct. 2011).

ZTE Corporation et al., "Discussion on Control Channel Design for NR MIMO," 3GPP TSG RAN WG1 Meeting #85, R1-165038, Nanjing, China (May 23-27, 2016).

ZTE Corporation et al., "WF on the design of downlink control channel," 3GPP TSG RAN WG1 Meeting #86, R1-168274, Gothenburg, Sweden (Aug. 22-26, 2016).

CATT, "Beam selection for CSI-RS beamforming," 3GPP TSG RAN WG1 Meeting #80bis, R1-151365, Belgrade, Serbia (Apr. 20-24, 2015).

\* cited by examiner

METHODS AND APPARATUS FOR BEAM CONTROL IN BEAMFORMED SYSTEMS

CROSS REFERENCE TO RELATED APPLICATIONS

This application is the U.S. National Stage, under 35 U.S.C. § 371, of International Application No. PCT/US2017/020384 filed Mar. 2, 2017, which claims the benefit of U.S. Provisional Patent Application No. 62/302,962, which was filed on Mar. 3, 2016, the contents of which are hereby incorporated by reference herein.

BACKGROUND

Above-6 GHz frequencies, such as mmW and cmW, have traditionally not been used for cellular systems due to propagation characteristics that have been presumed unfavorable for wireless communication in outdoor environments. Higher frequency transmissions generally tend to experience higher free space path loss. Rainfall, atmospheric gasses (e.g., oxygen), and foliage may add further attenuation compared to sub-6 GHz frequencies. In addition, penetration and diffraction attenuation may become more severe at above 6 GHz frequencies as opposed to sub-6 GHz frequencies. Such propagation characteristics of above-6 GHz frequencies may result in significant Non Line-Of-Sight (NLOS) propagation path loss. For example, at mmW frequencies, NLOS path loss may be more than 20 dB higher than Line-Of-Sight (LOS) path loss and may severely limit the coverage of the mmW transmission.

Recent channel measurements have demonstrated feasibility of outdoor mmW cellular coverage with the help of beamforming techniques. The measurement data shows that the beamforming gain may not only be able to provide required coverage for cellular control signaling in NLOS conditions but may also boost the link capacity to achieve higher data throughput in LOS conditions. Antennas that implement such beamforming techniques may need to provide high gain and, therefore, be highly directional, which may require use of large antenna arrays that are electronically steerable at both the transmitter and receiver.

SUMMARY

Methods and apparatus are described. A method, implemented in a wireless transmit/receive unit (WTRU), includes monitoring a first control channel search space (SS) associated with a first normal beam set comprising a first beam set. The WTRU initiates extended monitoring and monitors, subsequent to a trigger based on a measurement by the WTRU, a control channel SS associated with an extended beam set comprising the first beam set and one or more additional beam sets. The WTRU determines a second beam set from the extended beam set. The determination is based on a received control channel beam switch command or based on a control channel SS in which a beam switch command is received. The WTRU monitors a second control channel SS associated with a second normal beam set comprising the determined second beam set.

BRIEF DESCRIPTION OF THE DRAWINGS

A more detailed understanding may be had from the following description, given by way of example in conjunction with the accompanying drawings wherein.

DETAILED DESCRIPTION

Figure 1A:
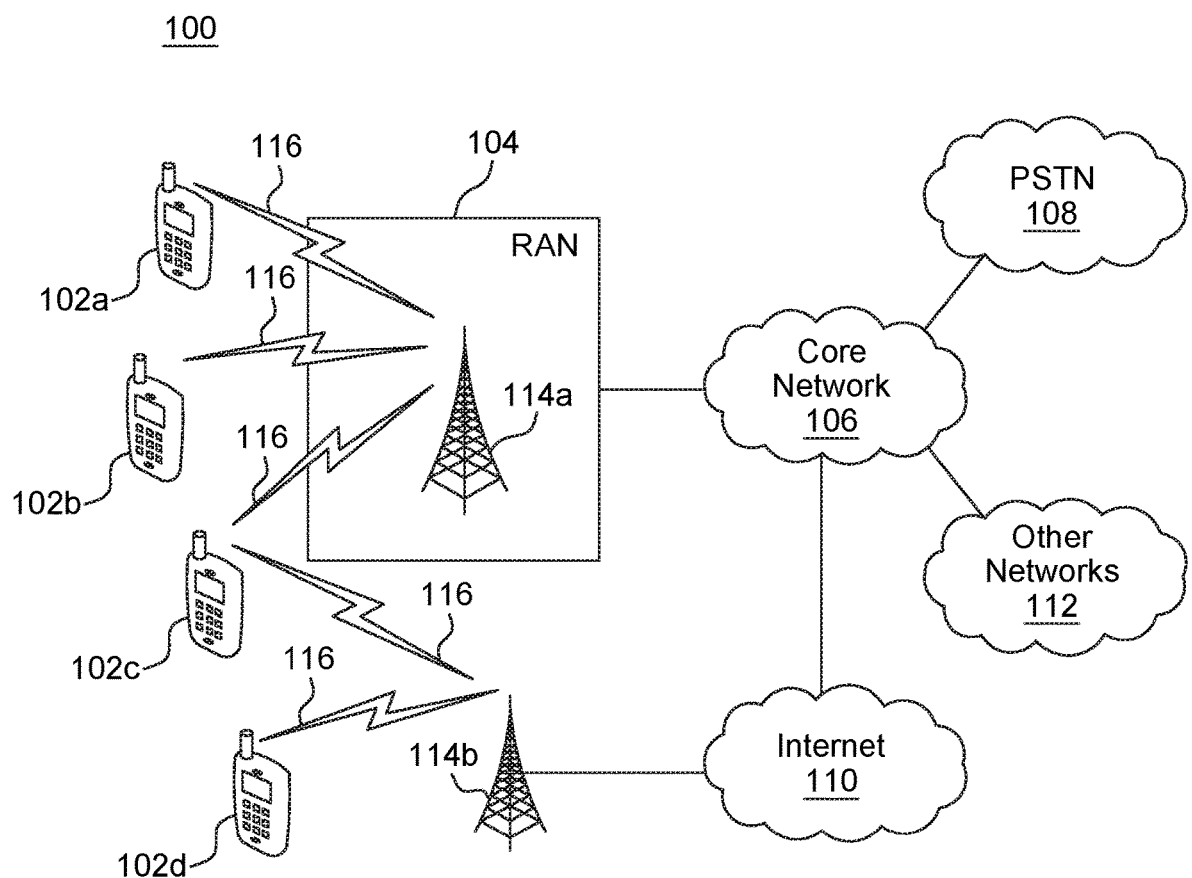
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
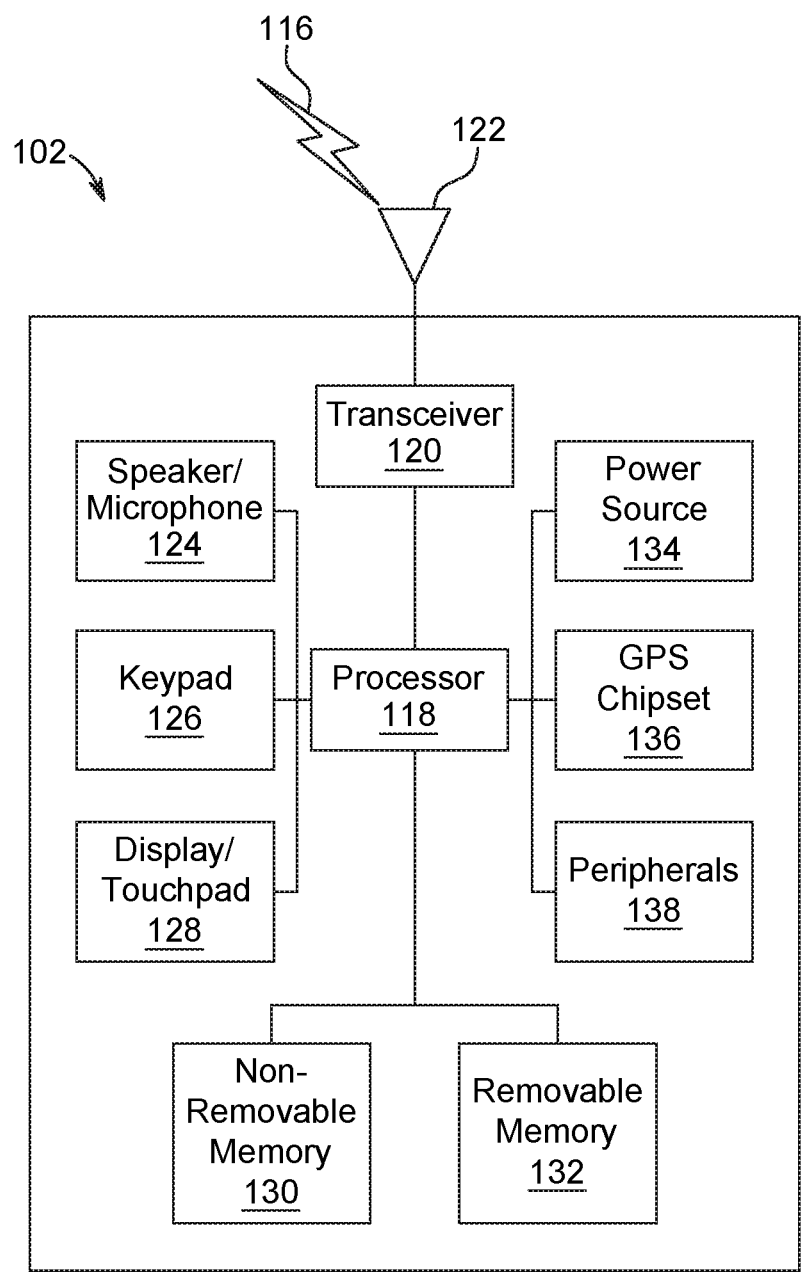
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
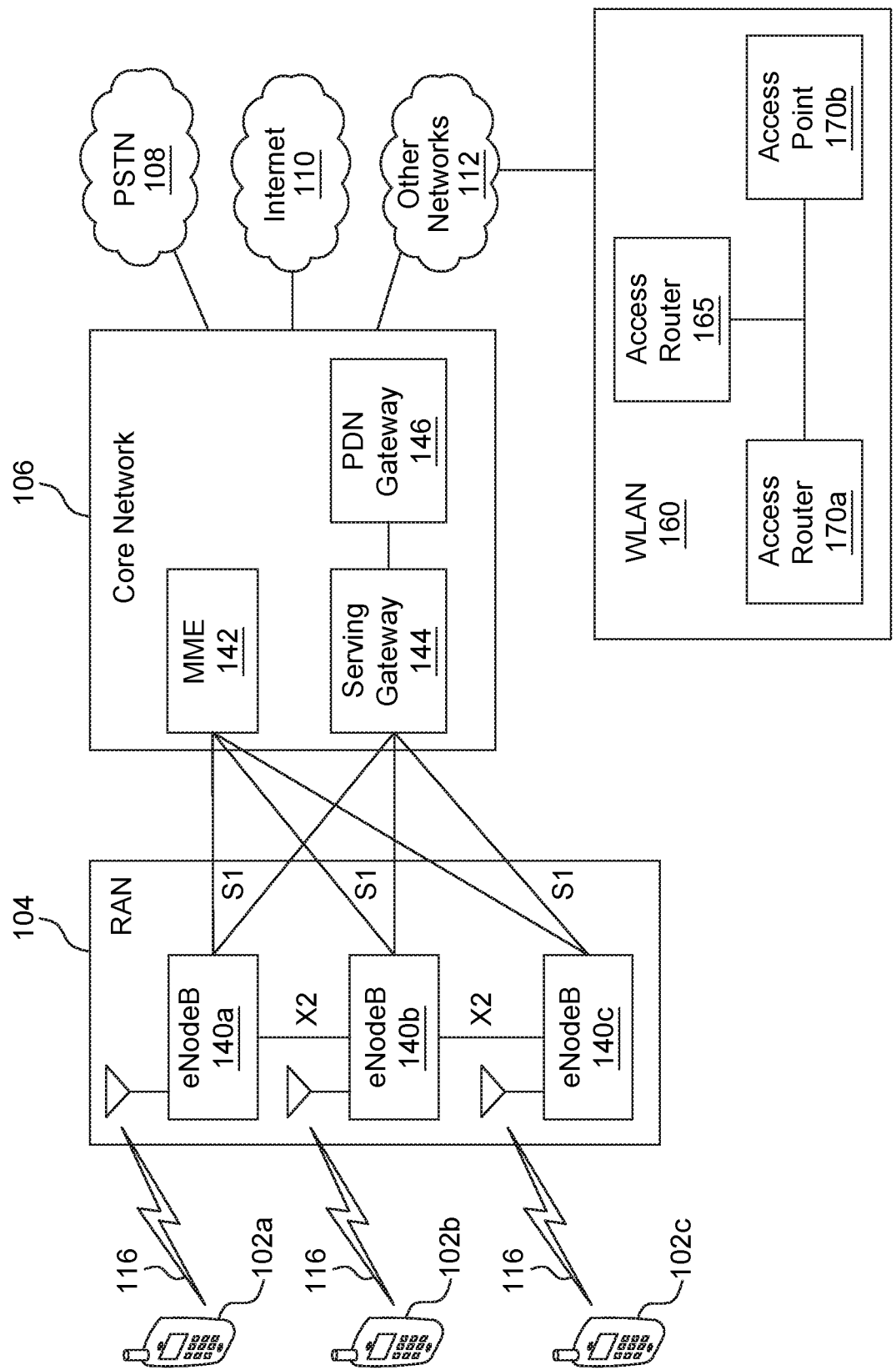
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Multiple above-6 GHz frequency bands have been evaluated, including, for example, 10 GHz and 15 GHz bands (cmW frequency band) and 28 GHz, 39 GHz, 60 GHz and 73 GHz band (mmW frequency band). These higher frequency bands may be allocated, for example, as licensed, lightly licensed and unlicensed spectrum.

Depending on the allocation of the spectrum and its propagation characteristics, high frequency bands, such as described above, may be deployed in various cellular network configurations. For example, mmW frequencies may be used for homogenous networks with mmW stand-alone Macro-base stations, Micro-base stations, and Small Cell base stations (SCmBs). A heterogeneous network may include a mmW stand-alone small cell network overlaid with a long term evolution (LTE) Macro-network and/or Micro-network at sub-6 GHz frequencies. In such a network, a network node may be connected to both above-6 GHz frequencies (e.g., mmW system) and below-6 GHz frequencies (e.g., 2 GHz LTE system). This type of connectivity may be referred to as dual connectivity. In embodiments, carrier aggregation may be applied to combine above-6 GHz (e.g., mmW carriers) and sub-6 GHz carriers (e.g., 2 GHz LTE carriers). Embodiments described herein may apply to any above-6 GHz cellular deployment.

Waveforms, such as OFDM, broad-band Single Carrier (SC), SC-OFDM, generalized OFDM, filter bank multi-carrier (FBMC), or multi-carrier—CDMA (MC-CDMA), may be used for above-6 GHz systems. Waveforms may have different peak to average power (PAPR) performance, sensitivity to transmitter non-linearity, bit error rate (BER) performance, resource channelization and implementation complexity. While frame structure may depend on the applied waveform, it may also be dimensioned to meet above-6 GHz system requirements. For example, in order to achieve very low latency, a higher-frequency cellular system may have a subframe length of 100 us.

Figure 2:
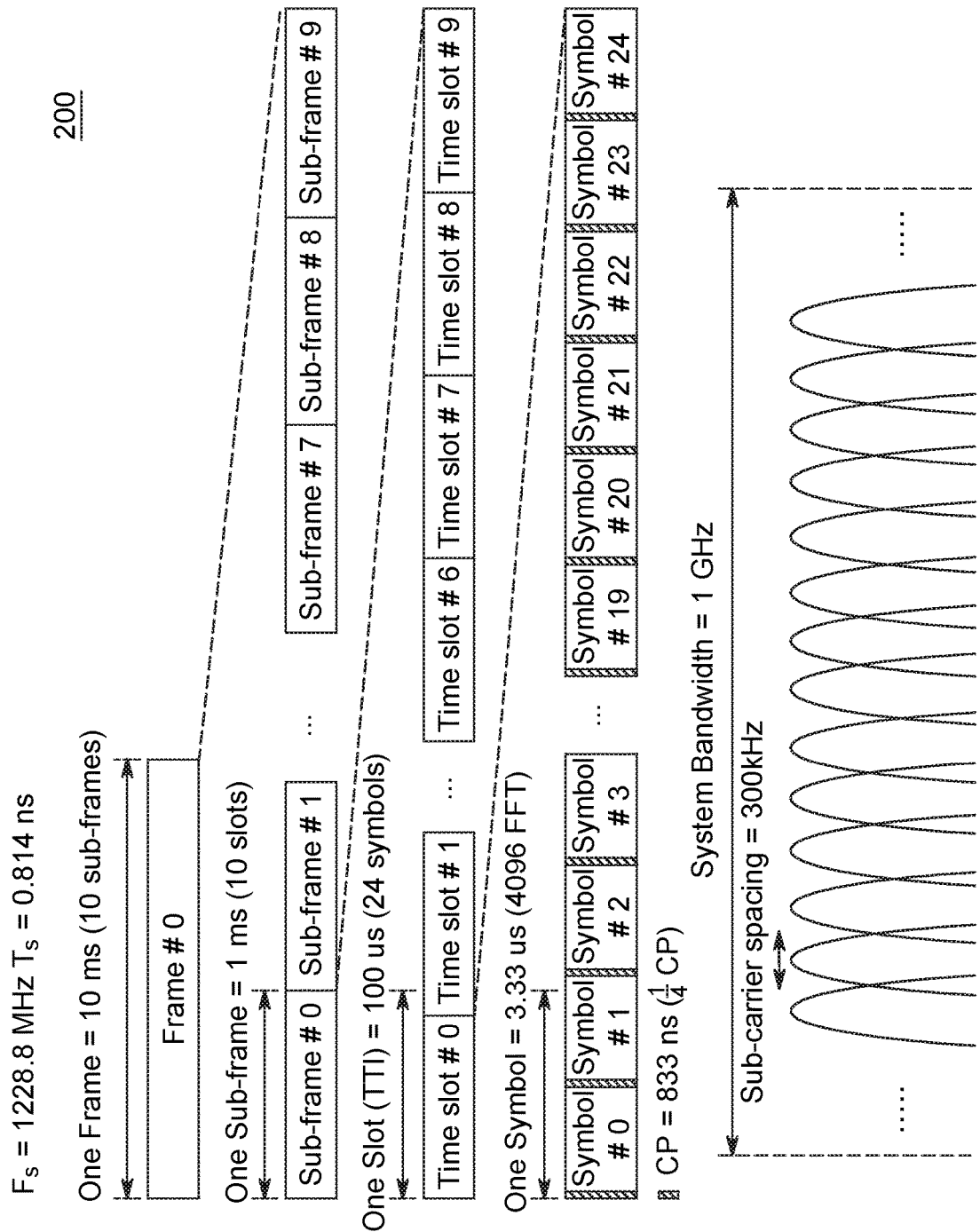
FIG. 2 is a diagram of an example orthogonal frequency division multiplexing (OFDM) frame structure for an example 1 GHz system bandwidth.

FIG. 2 is a diagram 200 of an example OFDM frame structure for an example 1 GHz system bandwidth. In the example illustrated in FIG. 2, the OFDM-based frame structure has a sub-carrier spacing of 300 kHz with a corresponding symbol length of 3.33 μs. Considering that a cyclic prefix (CP) length may span over the entire length of the channel time dispersion in order to eliminate inter-symbol interference, one example of a CP for a $T_{symbol}$ of 3.33 μs may be ¼ of $T_{symbol}$ at 0.833 μs. This example numerology may be used for a range of above-6 GHz system bandwidths (e.g., from 50 MHz to 2 GHz) with corresponding Fast Fourier Transform (FFT) length.

Figure 3:
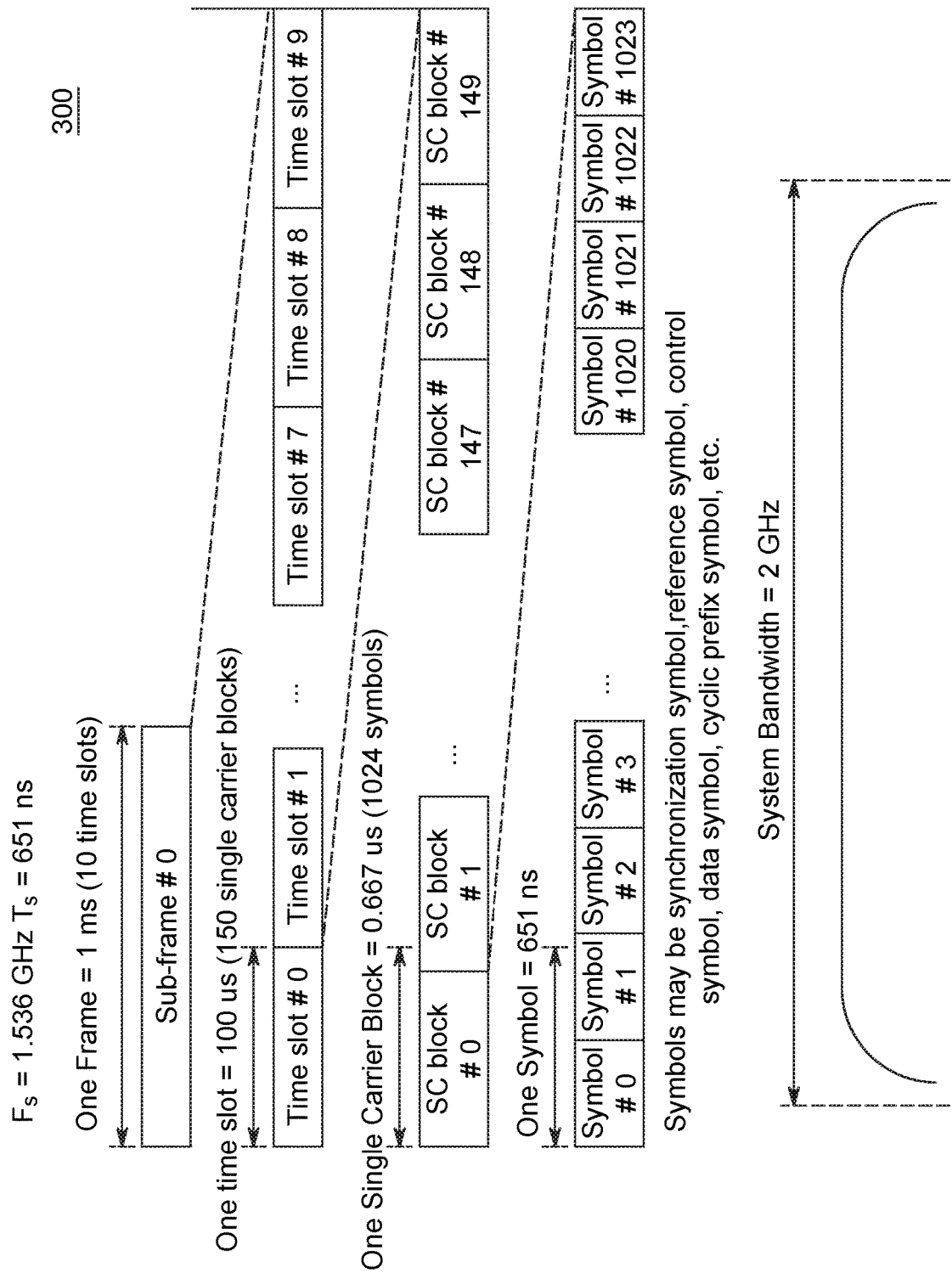
FIG. 3 is a diagram of an example single carrier frame structure for an example 2 GHz system bandwidth.

FIG. 3 is a diagram 300 of an example single carrier frame structure for an example 2 GHz system bandwidth. The frame structure illustrated in FIG. 3 is based on use of a single carrier over the entire system bandwidth, which is 2 GHz in the illustrated example, but may range, for example, from 50 MHz to 2 GHz. The sampling frequency may be 1.536 GHz with a 1024 FFT. The subframe may be 100 μs and may have 150 SC blocks. Each block may be 1024 symbols that may be used for synchronization, reference, control, data, cyclic prefix or other system purpose.

An above-6 GHz system, such as a cmW system or an mmW system, may apply any waveform and frame structure, or any combination of waveforms and frame structures, as described above. Embodiments described herein may apply to any or all of these waveforms and frame structures.

Above-6 GHz systems may use Frequency Division Duplex (FDD), Time Division Duplex (TDD), Spatial Division Duplex (SDD) or any combination thereof in conjunction with either half-duplex or full-duplex mechanisms. A full-duplex FDD system may use a duplex filter to allow simultaneous downlink and uplink operation at different frequencies separated by a duplex distance. A half-duplex FDD system may not use a duplex filter because the downlink and uplink operations may take place at different time instance in its dedicated frequency. A TDD system may have the downlink and uplink operate at the same frequency at different time instances. An SDD system, for example in a beamformed system, may enable a network node to transmit and receive at a same frequency and time instance but at different outgoing and incoming spatial directions.

An above-6 GHz network may use, for example, FDMA, TDMA, Spatial Division Multiple Access (SDMA), Code Division Multiple Access (CDMA), Non-orthogonal Multiple Access (NOMA) or any combination thereof. FDMA, TDMA, SDMA and CDMA may be applied in an orthogonal manner to avoid interference.

Multiple network nodes may be assigned to simultaneously use different frequency resources in an FDMA system or to access the system frequency resource at different time instances in a TDMA system. Moreover, the network nodes may access the same frequency resources at the same time but using different codes in a CDMA system. An SDMA system may assign a spatial resource to network nodes to operate at a same frequency, time and code resource. For example, in a beamformed network, WTRUs may use different beams.

In a NOMA system, multiple network nodes may be assigned overlapping or the same resource in the frequency, time, code or spatial domains but may apply additional mechanisms to remove interference caused by the non-orthogonal use of the resource between users. For example, two WTRUs may be located relatively far from each other, and the difference of their path loss to the base station may be large. They may be assigned the same frequency resource in the same subframe with very different transport formats. Superposition coding and a successive interference cancellation (SIC) receiver may be used for a WTRU to remove the received signal intended for the other.

An above-6 GHz system, for example a cmW or mmW system, may apply any duplex scheme, multiple access, or combination thereof, as described above. Embodiments described herein may apply to all of these duplex and multiple access schemes.

An above-6 GHz system may have a number of physical channels and signals for various system purposes. Certain signals may be used for multiple system procedures. For example, synchronization signals may be predefined and may be used for cell timing/frequency synchronization. A synchronization signal may be transmitted according to a pre-defined periodicity. In a beamformed system, such as a cmW or mmW network, the signal may provide beam timing and aid in frequency acquisition. The physical broadcast channel (PBCH) may carry broadcast information, such as cell specific system information (SI). A downlink reference signal may be a pre-defined sequence transmitted to enable various system procedures, such as channel estimation for control channel, channel statement measurement, timing and frequency fine-tuning, and system measurement. There may be different types of reference signals. For example, in a beamformed system, such as a cmW or mmW network, a downlink reference signal may be used, for example, for beam acquisition, beam pairing, beam tracking, beam switching, and beam measurement.

The physical downlink control channel (PDCCH) may carry all data related control information to, for example, properly identify, demodulate and decode the associated data channel. A physical downlink data channel may carry payload information in the form of a medium access control (MAC) protocol data unit (PDU) from the MAC layer. The resource allocation of this channel may be carried in the scheduling information in the PDCCH. A data demodulation reference signal may have symbols that may be transmitted for channel estimation of the downlink control or data channel. The symbols may be placed together with the associated control or data symbols in the time and frequency domain according to a pre-defined pattern to ensure correct interpolation and reconstruction of the channel.

An uplink reference signal may be used, for example, for uplink channel sounding and uplink system measurement. In a beamformed system, such as a cmW or mmW network, an uplink reference signal may be used, for example, for uplink beam acquisition, beam pairing, beam tracking, beam switch, and beam measurement. The physical random access channel (PRACH) may carry a pre-defined sequence in connection with a random access procedure. The physical uplink control channel (PUCCH) may carry uplink control information, such as channel state information, data acknowledgement, and scheduling requests. A physical uplink data channel may carry payload information in the form of a MAC PDU from the WTRU MAC layer. The resource allocation of this channel may be conveyed in the PDCCH. A data demodulation reference signal may have symbols that may be transmitted for channel estimation of the uplink control or data channel. The symbols may be placed together with the associated data symbols in the time and frequency domain according to a pre-defined pattern to ensure correct interpolation and reconstruction of the channel.

An above-6 GHz system, such as a cmW or mmW system, may deploy the signals and channels described above. Embodiments described herein may apply to all of these physical signals and channels.

Beamforming may be important in above-6 GHz systems, such as cmW and mmW systems. For example, an outage study conducted at 28 GHz and 38 GHz bands in urban areas using a steerable 10 o-beamwidth and a 24.5-dBi horn showed consistent coverage may be achieved with a cell radius of up to 200 meters.

LTE WTRUs are currently assumed to have an omni-directional beam pattern and may perceive a super-imposed channel impulse response over the entire angular domain. Thus, an aligned beam pair, such as at mmW frequencies, may provide an additional degree of freedom in the angular domain compared with the current LTE system.

A phase antenna array (PAA) may be used for beamforming with element spacing at, for example. $0.5\lambda$, and the phase antenna may apply different beamforming algorithms, such as fully digitized beamforming, analog beamforming (e.g., for one or more radio frequency (RF) chains), and hybrid beamforming.

Figure 4:
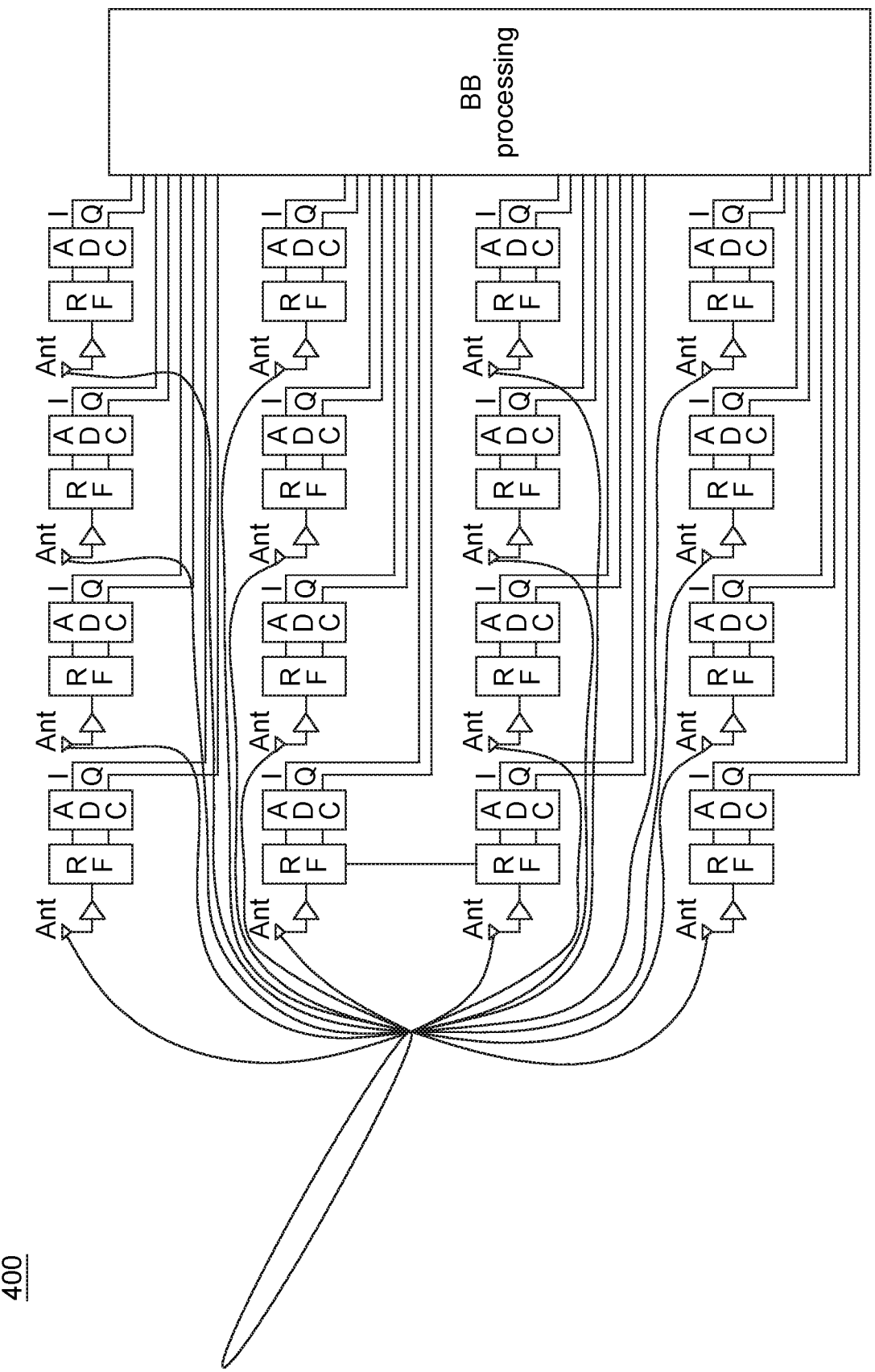
FIG. 4 is a diagram of an example phase antenna array (PAA) for fully digitized beamforming.

FIG. 4 is a diagram 400 of an example PAA for fully digitized beamforming. A fully digitized beamforming approach, such as illustrated in the example of FIG. 4, may have a dedicated RF chain, including RF processing and analog to digital conversion (ADC) for each antenna element. The signal processed by each antenna element may be independently controlled in phase and amplitude to optimize channel capacity. Thus, for fully digitized beamforming, the configuration may have the same number of RF chains and ADCs as antenna elements. While offering very high performance, fully digitized beamforming may impose a high cost and complexity to implement and may cause high energy consumption in operation.

Figure 5:
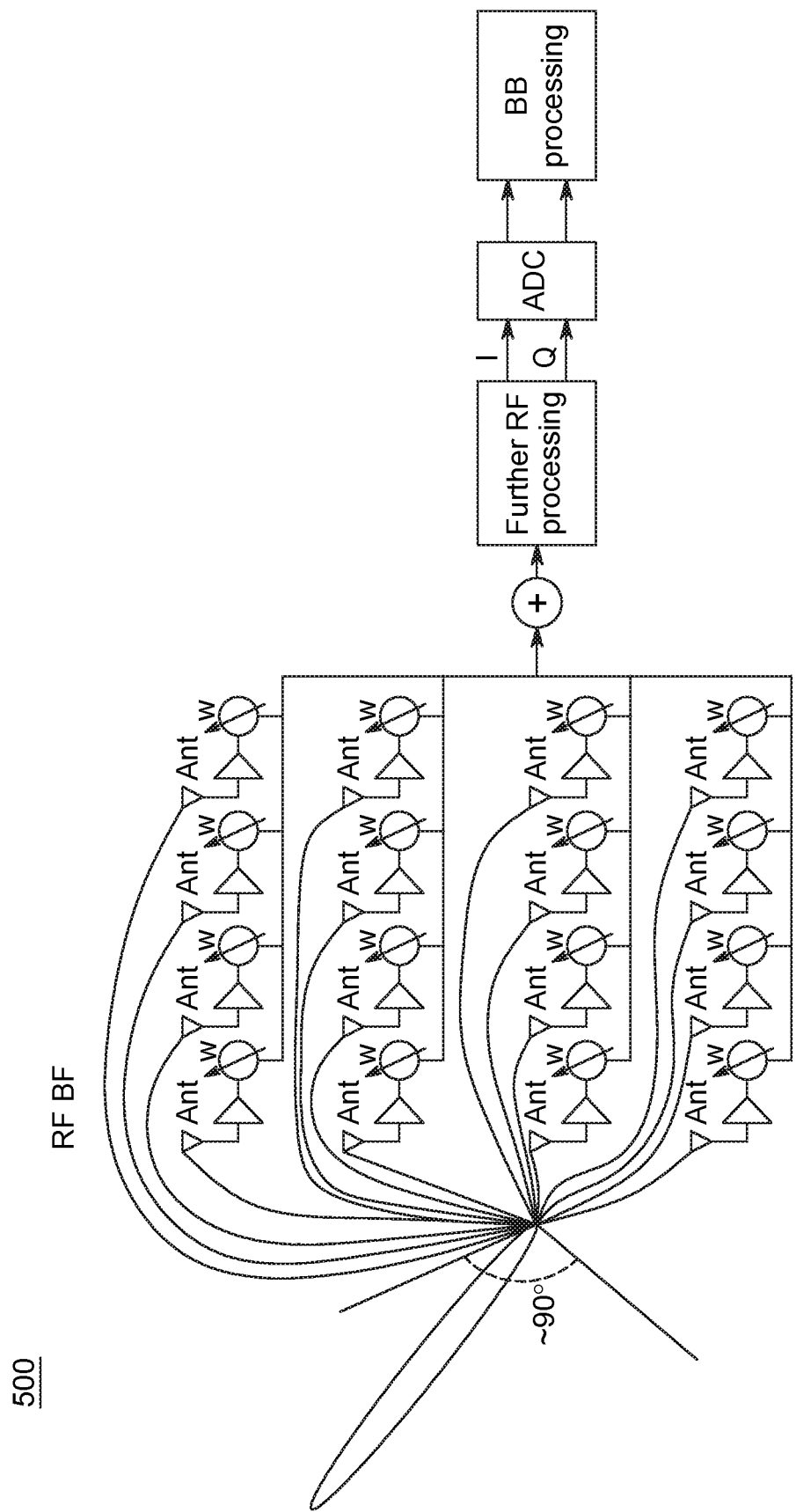
FIG. 5 is a diagram of an example of analog beamforming with one PAA that includes one radio frequency (RF) chain for a number of antenna elements.

FIG. 5 is a diagram 500 of an example of analog beamforming with one PAA that includes one RF chain for a number of antenna elements. In the example illustrated in FIG. 5, each antenna element is connected to a phase shifter that may be used to set the weight for beamforming and steering. The implemented number of RF chains may be significantly reduced as well as the energy consumption.

The phase shifting and combining may be implemented in different stages, such as an RF stage, a baseband beamforming (BB) analog stage or a local oscillator (LO) stage. One example is a single-beam analog configuration, which may operate one beam at a time where the single beam may be placed, for example, at the strongest angular direction, such as a line of sight (LOS) path obtained from beam measurement. A broad beam pattern may cover a range of angular directions at the expense of reduced beamforming gain.

Hybrid beamforming may combine digital precoding and analog beamforming. The analog beamforming may be performed over the phase array antenna elements, each associated with a phase shifter, and all connected to one RF chain. The digital precoding may be applied on the baseband signal of each RF chain.

Examples of system parameters for hybrid beamforming may include number of data streams (NDATA), a number of RF chains (NTRX), a number of antenna ports (NAP), a number of antenna elements (NAE), and a number of phase antenna arrays (NPAA). The configuration of these parameters may impact the system function and performance, as described in more detail below.

Figure 6:
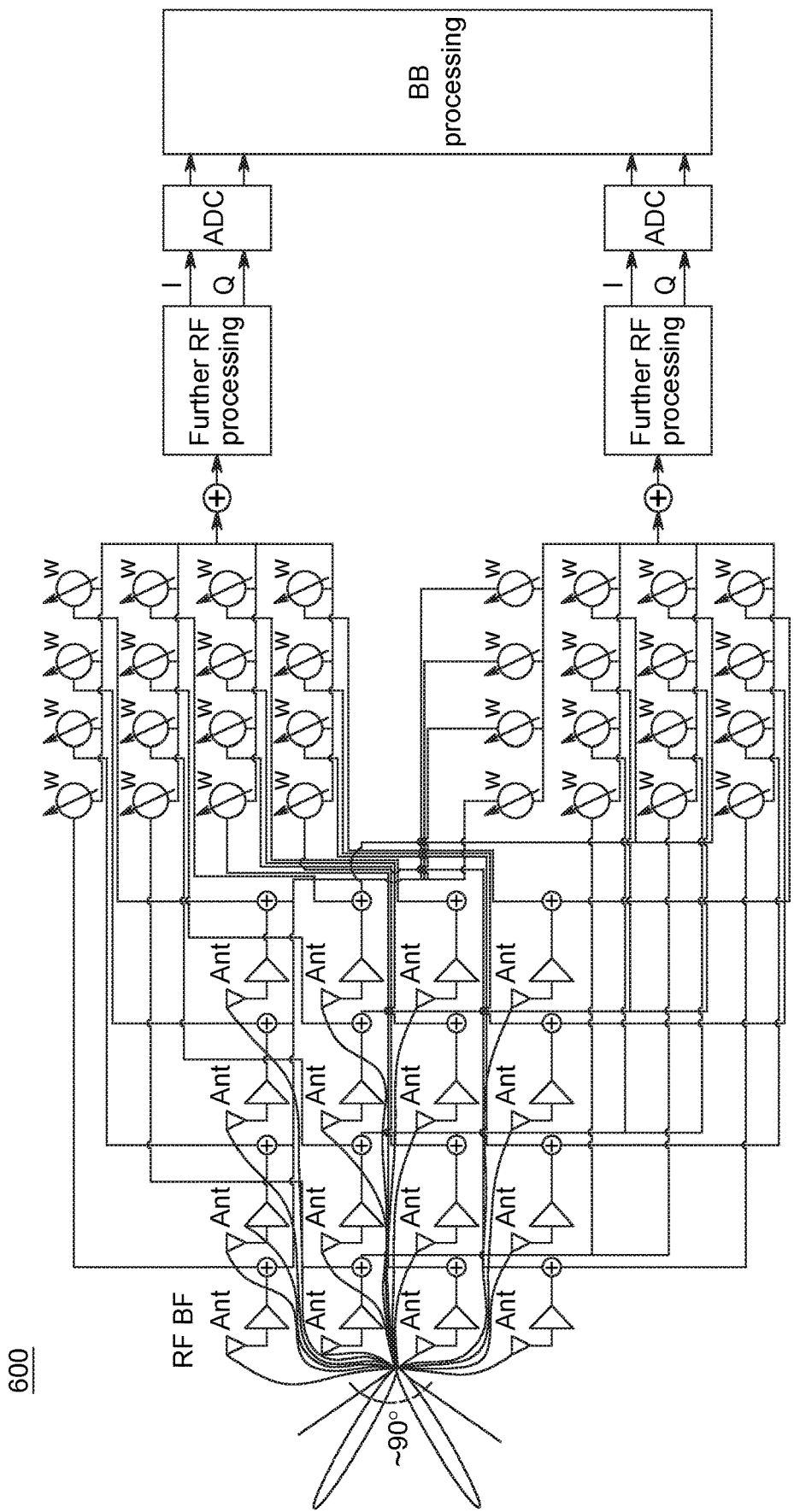
FIG. 6 is a diagram of an example of analog beamforming with one PAA and two RF chains.

FIG. 6 is a diagram 600 of an example of analog beamforming with one PAA and two RF chains. In such an embodiment, one antenna port may carry a beamformed reference signal uniquely associated with the antenna port that may be used to identify the antenna port. In the example illustrated in FIG. 6, one PAA of size 4×4 is connected to two RF chains, and each RF chain has a set of 16 phase shifters. The PAA may form two narrow beam patterns within a +45 o and −45 o coverage in an azimuth plane. In this configuration, $N_{PAA} < N_{AP} = N_{TRX} < N_{AE}$.

Figure 7:
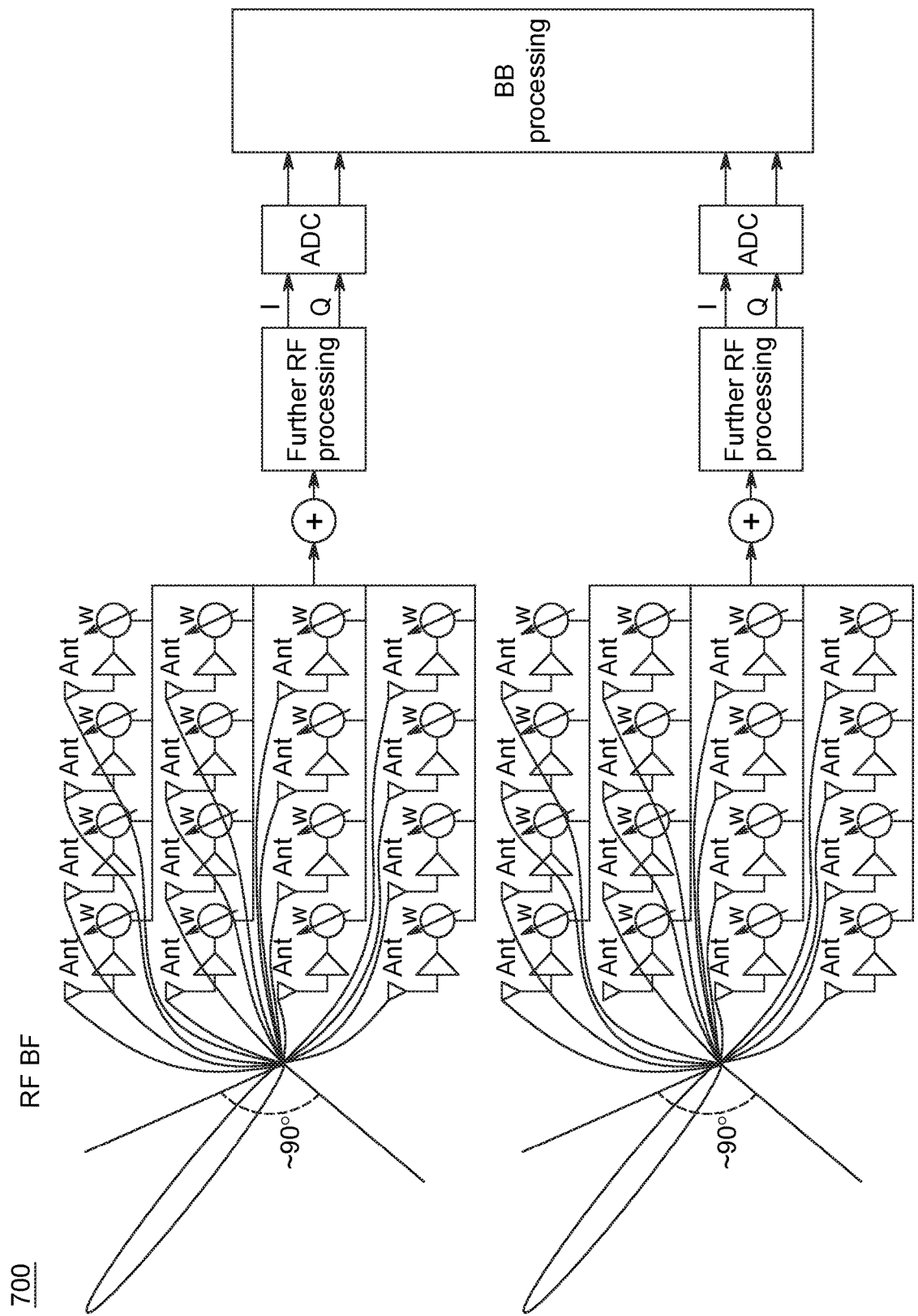
FIG. 7 is a diagram of an example of analog beamforming with two PAAs and two RF chains.

FIG. 7 is a diagram 700 of an example of analog beamforming with two PAAs and two RF chains. In the example illustrated in FIG. 7, each PAA has a dedicated RF chain (i.e., $N_{PAA} = N_{AP} = N_{TRX} \leq N_{AE}$). This configuration may allow a spatial independence between the two simultaneous beams by placing the PAAs at different orientations (e.g., in an azimuth plane). An aligned PAA arrangement may provide an aggregated larger coverage. The examples illustrated in FIGS. 6 and 7, with two RF chains, may apply multiple-input multiple-output (MIMO) with two data streams.

Figure 8:
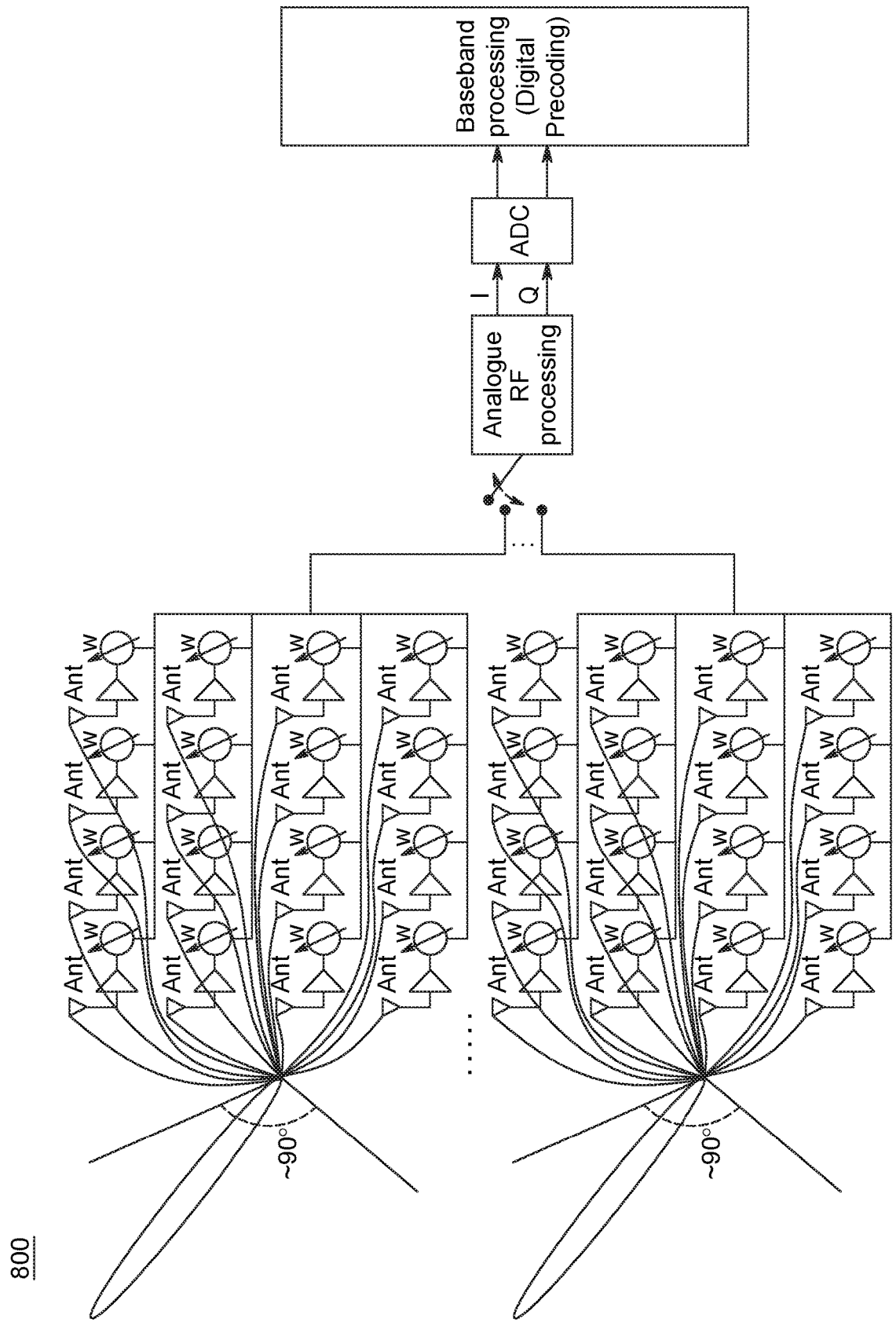
FIG. 8 is a diagram of an example of analog beamforming with two PAAs and one RF chain.

FIG. 8 is a diagram 800 of an example of analog beamforming with two PAAs and one RF chain. In embodiments such as illustrated in FIG. 8, multiple PAAs may be connected to a single RF chain using a switch (i.e., $N_{AE} > N_{PAA} > N_{AP} = N_{TJ}$). Each PAA may form a narrow beam pattern covering from +45 o to −45 o in an azimuth plane. They may be oriented separately, so a single-beam network node may have good coverage using a beam at different directions at different time instances.

Above-6 GHz systems, such as cmW and mmW systems, may apply different beamforming techniques, such as analog, hybrid and digital beamforming, as described above. Embodiments described herein may apply to all of these beamforming techniques.

To overcome high path loss at above 6 GHz frequencies, transmit and/or receive beamforming may be applied to control channel transmission/reception. The resulting beamformed link may be considered as spatial filtering and may limit the WTRU to receiving incoming angular paths. Legacy cellular systems rely on Omni directional or cell-wide beams for control channel transmissions, and, in these systems, the placement of the control channel is well defined from a WTRU point of view (e.g., in the control region). At higher frequencies, however, each base station may have multiple control channel beams to cover the cell, and the WTRU may only be able to receive a subset of them. Embodiments described herein may provide methods and apparatus for identifying candidate control channel beams and their location in the subframe structure.

Millimeter wave base stations (mBs) and WTRUs in a beamformed system may have a diverse set of capabilities, such as a different number of radio frequency (RF) chains, different beams widths, or a different number of phase antenna arrays (PAAs). mBs with multiple RF chains may transmit multiple control channels beams in the same symbol, and WTRUs with multiple RF chains may receive the same control symbol using multiple receive beam patterns. mBs with one RF chain may need to multiplex control channel beams in the time domain (e.g., different symbols and/or different subframes). mBs with multiple RF chains may multiplex control channel beams in both the time and spatial domains Embodiments described herein may provide a framework for beamformed control channel design that may support the varying capabilities of mBs and WTRUs and to support both time and spatial domain multiplexing of control channel beams.

The Long Term Evolution (LTE) common reference signal design assumes cell wide transmission. For a multi-beam system, modification to reference signal design may be needed to discover, identify, measure and decode each control channel beam. In a multi-beam system, interference between beams may degrade overall cell capacity. Embodiments described herein may provide additional mechanisms to mitigate inter-beam interference for both intra-cell and inter-cell scenarios.

As mentioned above, beamforming may be required at both the transmitter and the receiver to achieve the high throughput requirements of 5G systems. Embodiments described herein may provide capabilities for supporting WTRUs with diverse beamforming capabilities. Further, embodiments described herein may provide WTRU-assisted, network controlled procedures for narrow beam pairing on the uplink (UL) and downlink (DL).

The directional nature of mmW links may mean that the number of radio link failure (RLF) events may increase compared to LTE links for the same small cell inter-site distances (ISDs) and WTRU speeds. In addition to mobility, changes to the WTRU orientation may also cause RLF events when using mmW links. Further, mmW links may be prone to blockages due to changes in the environment, such as due to moving people and buses. Embodiments described herein may provide methods and apparatus for the WTRU to detect and recover from beam failures. Further, connectivity concepts may be provided, which may aid in overcoming issues related to beamforming and make mmW carriers feasible for cellular access.

Basic building blocks for beam control for beamformed systems may include a subframe structure, beamformed control channels, beamformed data channels, a data region with one or more beamformed data channels, a control region with one or more beamformed control channels, and gaps. Each building block is described in detail below.

Regarding the subframe structure, each subframe may include multiple symbols, one or more of which may be used to transmit or receive one or more control signal, control channel, control information and/or data channel. When referred to herein, a subframe may be used interchangeably with a scheduling interval, a slot or a predefined time unit.

Regarding beamformed control and data channels, a control channel or a data channel may be transmitted using a specific radiation pattern or beam. Each control or data channel beam may be associated with one or more of a unique reference signal, steering vector, scrambling code, antenna port, time, code, spatial, frequency resource or control channel identity. Each mB or cell may transmit multiple beamformed control and/or data channels. In some embodiments, beamformed control and/or data channels may be multiplexed in time.

Regarding a data region with one or more beamformed data channels, one or more symbols within a subframe where the data channel is transmitted may be referred to as data region. Within a subframe, the data region may include multiple data channel beams multiplexed in time. For example, a data channel in a particular beam may occupy one or more symbols, and the remaining symbols within the same subframe may be used to transmit a data channel in other beams. Each data channel beam within the data region may have variable beam widths. In some embodiments, the maximum data channel beam width for a WTRU may be as wide as its control channel beam width. One WTRU may receive one or more data channels transmitted using one or more beams or beam widths within a subframe or across different subframes. Multiple WTRUs may be time multiplexed within a subframe, within the same data channel beam or across different data channel beams. A minimum schedulable time resource within a subframe may be a symbol or a group of symbols. Scheduling granularity may be less than a subframe (e.g., a new downlink control information (DCI) format may carry allocation information at the symbol level or symbol group).

Regarding a control region with one or more beamformed control channels, one or more symbols within a subframe where the control channel is transmitted may be referred to as a cell specific control region. Within a subframe, the cell specific control region may include multiple control channel beams multiplexed in time. One or more symbols within a subframe where the control channel for a specific beam is transmitted may be referred to as a beam specific control region. In some embodiments, a control region may refer to a cell specific control region and/or a beam specific control region. Control region size may be fixed or be flexible. In some embodiments, a control region and a data region may overlap, and one or more symbols may carry both a control channel and a data channel multiplexed in the frequency, code or spatial domain.

Regarding gaps, they may be placed between two consecutive symbols carrying transmissions with different beam directions, radiation patterns or steering vectors. When referred to herein, a gap may be used interchangeably with a switching period, a guard period, a silence period, an absence of transmission or a discontinuous transmission (DTX) period. Depending on the placement, different gap types may be identified, including, for example, gaps between two control symbols or groups of control symbols, gaps between two data symbols or groups of data symbols, and gaps between control symbols and data symbols (e.g., between the last control symbol and the first data symbol or vice versa).

Different gap types may be preconfigured with different durations. A same gap type may be preconfigured with a different duration in different subframes. Gaps may be selectively placed between two consecutive symbols that are transmitted with a different radiation pattern, beam pattern, direction or channel type. Gaps may be selectively placed between control and data symbols. Gaps within the same subframe may have different durations. Gaps may or may not be present in all subframes. Gaps may be placed between control symbols and may not be placed in the data symbols and vice versa. Within the control or data region, gaps may be selectively placed between subsets of symbols.

The gaps may be defined from a WTRU point of view. A WTRU may not be required to receive on the downlink (DL) during the gap periods (e.g., the gap between control symbols and data symbols for a particular WTRU). A WTRU may use the gap periods to decode the control channel, which may be received before the start of the gap period. A WTRU may use the gap periods to switch its receive beam or apply a new steering vector to receive the downlink data channel, which may be different from the receive beam or steering vector used to receive the downlink control channel. A WTRU may use the gap periods (e.g., the gap between data symbols or groups of data symbols for a particular WTRU) to switch its receive beam or apply a new steering vector to receive the downlink data channel, which may be different from the receive beam or steering vector used to receive the previous downlink data channel in the same or a different subframe.

A cell, such as a mmW cell or a 5G cell, may be defined by one or more transmissions that share at least one discovery signal characteristic. In embodiments, the one or more transmissions that share the at least one discovery signal characteristic may be limited in the spatial domain. The physical transmissions may originate from multiple transmission points. The discovery signal between different physical transmissions may be multiplexed in the time, frequency, code and/or spatial domain. In embodiments, a cell may be defined as a collection of beams from one or more transmission point. Each transmission point may be associated with one or more cells, where only a subset of beams from the transmission point may be associated with each cell. The 5G cell may be characterized by a virtual-ness property and/or an elasticity property.

The virtual-ness property may indicate that a cell is logical and is not tied to physical transmission points. Multiple transmission points that are associated with the cell may be considered to form a cluster.

In a traditional cellular architecture, hard edges/boundaries are created between adjacent cells. WTRUs located in these edges may suffer from low throughput, high interference, call drop or data interruptions due to frequent handovers. Cell densification may be a step toward improving aerial capacity, but cell densification may also lead to more edges per unit area.

The virtual-ness property may be extended to create edgeless cells from a WTRU's perspective. Dynamically coordinated transmissions may enable WTRU-centric-cells, where the WTRU may always receive the best possible signal to interference plus noise ratio (SINR). Densification of cells may also lead to increased mobility events (e.g., handovers) that may result in data interruption. The virtual-ness property may be used to create WTRU-specific moving cells where cells follow the WTRU and the mobility may be handled by inter-node coordination with minimal feedback (e.g., measurement reports) from the WTRU.

Each mB or a DL beam from the mB may be logically associated to a plurality of virtual cells, where each cell may be WTRU or service specific. This may be enabled by transmitting multiple discovery signals on the same beam separated in frequency or time.

The elasticity property of a cell may refer to its flexibility to adapt the coverage to satisfy predefined criteria, which may include one or more of reducing inter-cell interference, adapting the coverage according to WTRU distribution (e.g., increased capacity at locations with higher WTRU density), and time dependent coverage adaptation (e.g., based on time, day of week, etc.). In ultra-dense deployments with coverage diversity, the elasticity property may be used to provide a self-healing capability. For example, if one cell (cell2) loses power, another cell (cell1) may temporarily increase its coverage area to serve WTRUs in cell2. For directional transmissions, such as in higher frequencies, spatial coverage adaptation may be used to overcome blockage. Additionally, the flexible coverage adaptation may be seen as inter-cell interference coordination in the spatial domain. Small cell on/off may be considered as a promising approach to energy saving in ultra-dense deployments. With beamformed cells, selectively turning off directional transmissions instead of turning them off for the entire cell may provide finer grained control over energy efficiency.

Figure 9:
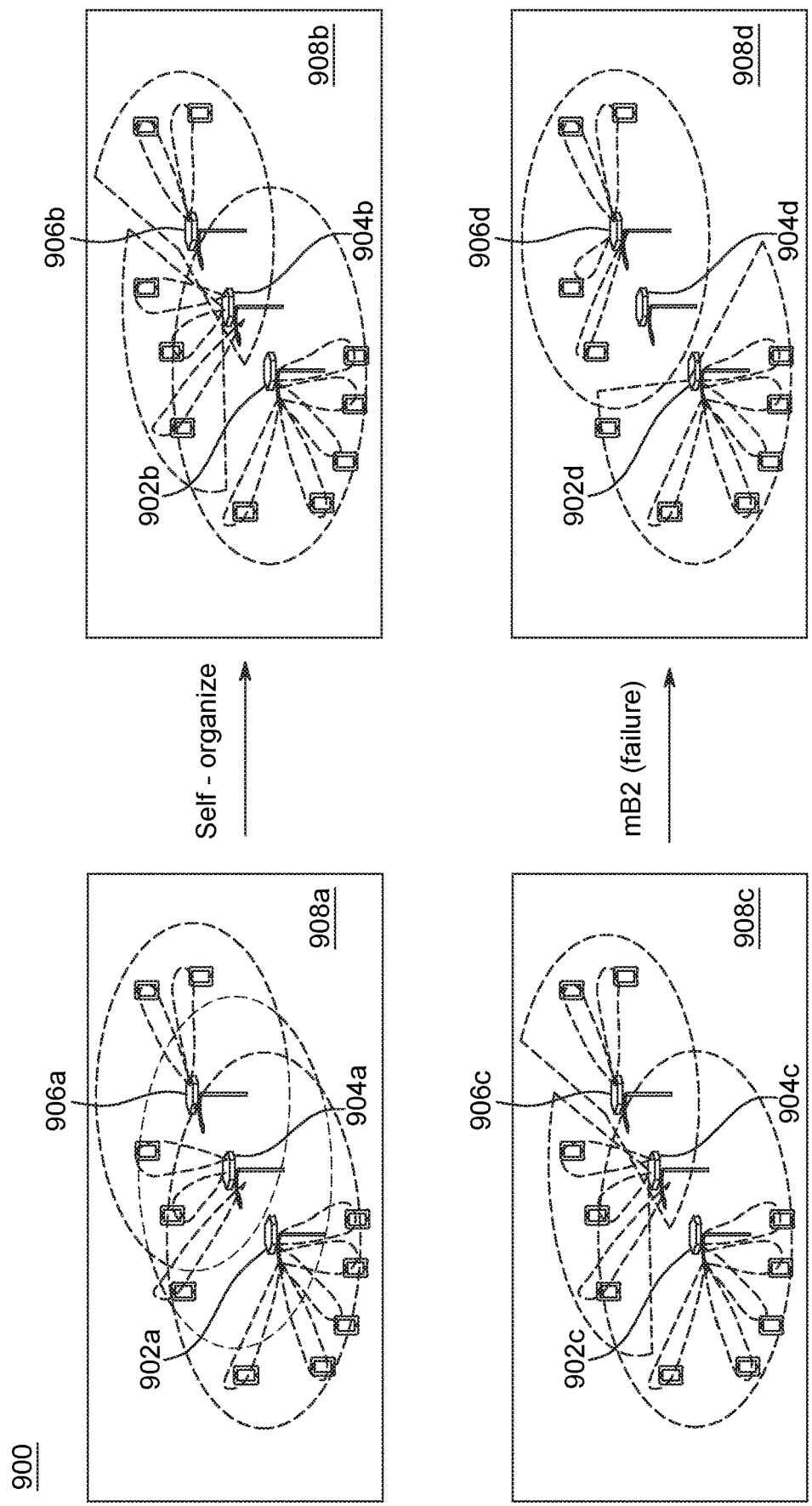
FIG. 9 is a diagram illustrating examples of the elasticity property in an ultra-dense deployment.

FIG. 9 is a diagram 900 illustrating examples of the elasticity property in an ultra-dense deployment. Four examples are illustrated in FIG. 9. In example 908a, three mBs 902, 904 and 906 operate with omni-directional coverage. The mBs may dynamically learn interference patterns, such as from WTRU feedback, and self-organize themselves to optimally service a given topology, WTRU distribution and service requirements, as in examples 908b and 908c. In the event of extreme blockage or sudden failure, as illustrated in the example 908c for mB 904, the mBs may perform self-healing to adapt their coverage area and provide service to WTRUs earlier serviced by the mB 904. Thus, using self-healing, a sudden coverage hole may be rectified by a graceful degradation in the overall areal capacity.

In embodiments, a WTRU may be associated with more than one mB. In such embodiments, in the downlink, a WTRU may obtain DL time synchronizations for each of the mBs. Further, the WTRU may determine the best beam pair for receiving downlink transmissions from the multiple cells. Such beam pairs may be mB-specific (i.e., different mBs may have different preferred receive beams at the WTRU). The multiple mBs to which a WTRU is connected may form a logical cluster. Coordination between the clusters may be centralized or distributed.

In the uplink, a WTRU may transmit random access or other reference signals on the UL so that the WTRU is uplink time synchronized with the multiple mBs. Additionally, such UL transmissions may be beamformed so that a preferred UL beam pair may be established between the WTRU and the mBs. Such beam pairs may be mB-specific (i.e., different mBs may have different preferred WTRU transmit beams).

Parts of WTRU context may be stored in the multiple mBs. The WTRU context may include both semi-static and dynamic parameters. The semi-static parameters may include, for example, WTRU ID, active radio bearer information, and/or WTRU capability information. The dynamic parameters may include layer 2 (L2) context (e.g., automatic repeat request (ARQ) context and/or packet data convergence protocol (PDCP) context, radio resource control (RRC) context, security configuration, mB specific DL beam IDs, and/or channel state information (CSI)). The dynamic parameters may be periodically synchronized between all the mBs in a WTRU specific cluster.

DL data may be made available at one or more mBs that form a WTRU cluster. For example, data from the serving gateway (SGW) may be multi-cast to mBs in the cluster. Additionally or alternatively, an anchor mB may receive data flows from the SGW and may subsequently broadcast the data to mBs in the cluster. Additionally or alternatively, a macro eNB, in the context of dual connectivity, may broadcast the data to one or more mBs in the cluster.

In ultra-dense deployments, a WTRU may be configured to search for backup mBs. The trigger for a backup mB search may depend on the serving mB signal quality. The backup mB search may be a function, for example, of one or more of a periodic timer expiry, a number of discovered backup mBs, and WTRU capability (e.g., number of RF chains or number of PAAs). A value for the periodic timer may be broadcast in the system information (SI).

The radio link between the WTRU and the network may be characterized by a beam pair formed from a transmit beam and a receive beam. In some embodiments, the beam pair on the DL may be different from the beam pair used in the UL, and vice versa. Each beam may be identified by a reference signal, sequence number, logical antenna port, and/or any other unique identity. Two beams in the beam pair may have the same beam width. In some embodiments, a WTRU may be connected to multiple base stations, and a separate beam pair may be defined for each of the radio links.

Different levels of beam pairing may be defined, including, for example, a wide beam pair, a narrow beam pair, and a wide-narrow beam pair. In embodiments, a WTRU may determine one or more preferred DL beams during a cell search and/or synchronization procedure, such as during reception of synchronization signals, PBCH signals and/or system information broadcast. Networks may determine one or more preferred UL beams during a random access or sounding procedure. A WTRU and a network may establish a beam pair upon completion of the random access procedure. A WTRU in connected mode may receive commands from the network to update the beam pairing and optionally agree upon backup beam pairs, perform beamformed transmissions on the UL for UL beam training, and transmit and/or receive data channels on specific narrow beams, which may be specified, for example, via scheduling grants or higher layer messages.

Beamforming at the WTRU may be required in addition to beamforming at the mB to compensate for the additional path loss at higher frequencies. Detailed methods and apparatus for UL beamforming and scheduling are described below.

Figure 10:
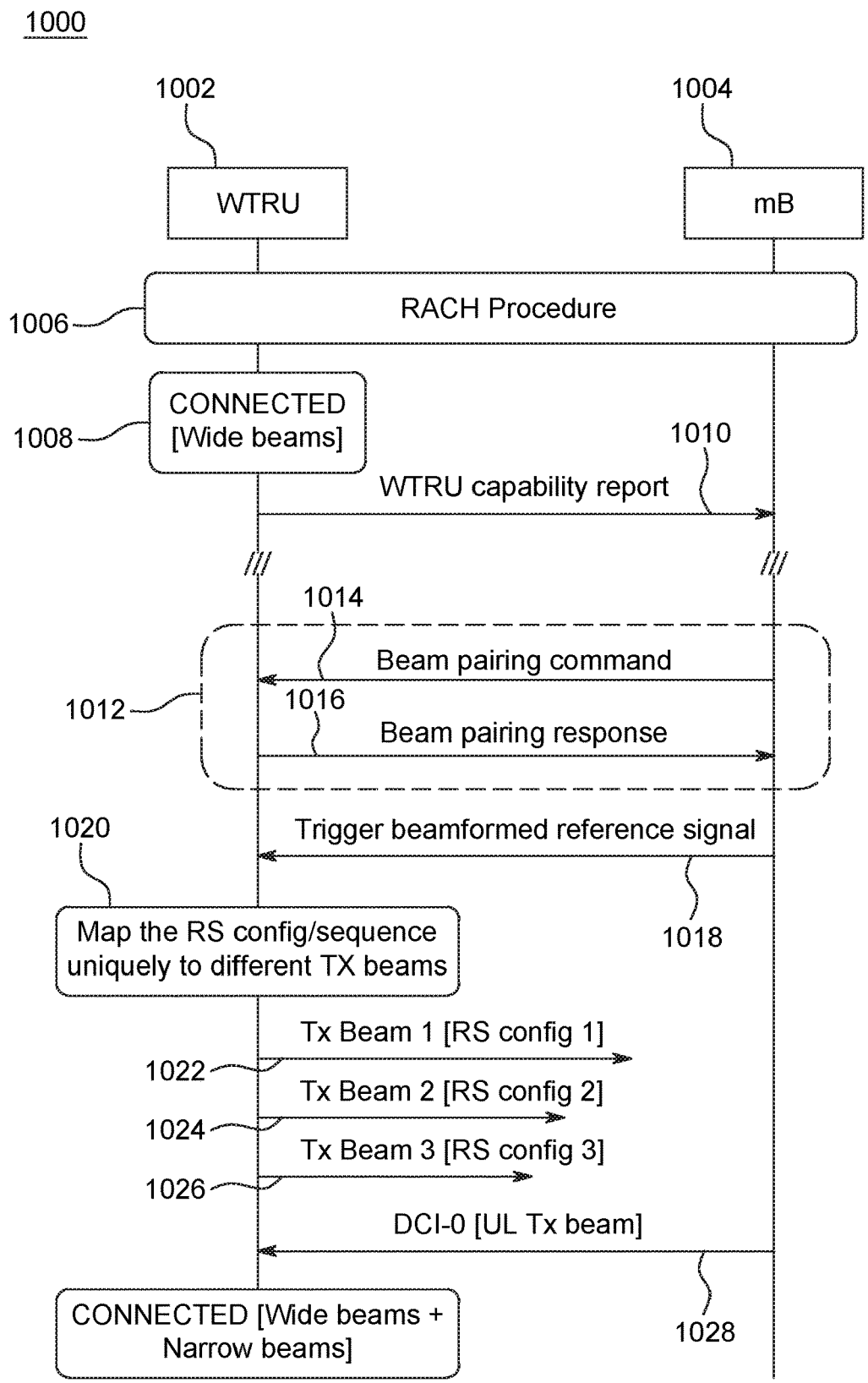
FIG. 10 is a flow diagram of an example method of beamforming and scheduling.

FIG. 10 is a flow diagram 1000 of an example method of beamforming and scheduling. In the example illustrated in FIG. 10, a WTRU 1002 performs a RACH procedure (1006) with an mB 1004. As described in more detail below, the WTRU 1002 may perform random access with multiple transmit beams or steering vectors to obtain an initial coarse estimate for a preferred UL wide beam and timing advance. The WTRU 1002 may then enter RRC connected mode (1008). The WTRU 1002 and mB 1004 may further perform a UL narrow beam pairing procedure to determine the best beam pair to use for high throughput data transfer and to reduce interference with coexisting links.

Once in RRC connected mode, the WTRU 1002 may transmit beamforming capability information (e.g., in a WTRU capability report) to the mB 1004 (1010). As described in more detail below, the WTRU 1002 may, for example, autonomously transmit a beamforming capability message after entering the RRC connected state or the mB 1004 may request the beamforming capability information via a request message. The WTRU 1002 and the mB 1004 may then engage in a beam pairing procedure 1012, which may involve an exchange of a beam pairing command (1014) and a beam pairing response (1016) between the WTRU 1002 and the mB 1004.

In the example illustrated in FIG. 10, the mB 1004 triggers a beamformed reference signal from the WTRU 1002 (1018). Further, in the example illustrated in FIG. 10, the WTRU 1002, in response to the trigger (1018), may map a reference signal configuration or sequence to multiple transmit beams (1020) and may transmit the reference signal on each of the beams (1022, 1024, 1026). Different procedures for transmitting the beamformed reference signal are described in detail in the embodiments below. The mB 1004 may grant a resource for a trigger UL reference signal transmission in the DCI (1028) and may, at the same time, provide an explicit reference signal sequence to be used for transmissions on that resource. As described in more detail below, the mB 1004 may also include a one bit command indicating a linkage of the reference signal sequence.

A WTRU may perform random access with multiple transmit beams or steering vectors to obtain an initial coarse estimate for a preferred UL wide beam and timing advance. A WTRU and mB may further perform a UL narrow beam pairing procedure to determine the best beam pair to use for high throughput data transfer and reduce interference with coexisting links. Embodiments described herein may be used for narrow beam pairing and/or wide beam pairing or re-pairing. In embodiments described below, a UL reference signal transmission may be replaced with a random access preamble transmission.

A WTRU may be configured with dedicated UL resources for a UL beam pairing procedure. In one embodiment, a resource configuration may depend on WTRU capability. WTRU capability may include one or more of: a total number of TX beams supported by the WTRU (which may include TX beams from multiple PAAs at the WTRU), a number of narrow TX beams associated (e.g., within the spatial coverage) with each random access channel (RACH) beam, a number of narrow TX beams associated (e.g., within the spatial coverage) with a current UL control channel beam, a quantized beamwidth supported by the WTRU, a number of PAAs in the WTRU, a number of RF chains in the WTRU, and a type of beamforming technique used by the WTRU (e.g., analog, digital or hybrid).

In embodiments, WTRU capability may be represented by different classes of devices, such as class low, medium or high. The WTRU class may determine a UL beamforming resource allocation.

A WTRU may transmit its beamforming capability via higher layer messaging (e.g., using an RRC message). The WTRU may autonomously transmit the message after entering the RRC connected state, or an mB may request the capability via a request message. In embodiments, different groups of random access resources may be associated with a WTRU class (e.g., low, medium, or high). A WTRU may implicitly indicate the device class by the choice of a random access resource group. In other embodiments, an mB may always configure a predefined set of resources for UL beam pairing irrespective of WTRU capability. In some cases, a WTRU may just need to indicate that it is capable of transmitting beams narrower than the UL beams used for random access. This one bit of information may be implicitly indicated via the choice of random access preambles. An mB may then further trigger the capability request message to obtain the number of UL narrow beams supported by the WTRU.

A WTRU may use dynamic indication to signal a change in its TX beam capability (e.g., self-blockage due, for example, to hand, head, or body). A WTRU may be configured to transmit a beamformed reference signal on the UL resources configured for beam pairing. Such configuration may include two parts, for example, a semi-static and a dynamic part.

A semi-static UL beam pairing resource configuration may be cell-specific, mB-RX-beam-specific and/or WTRU-specific. A WTRU may receive the semi-static configuration via a system information block (SIB) and/or WTRU-specific RRC configuration. The semi-static UL beam pairing resource configuration may include a beamformed reference signal sequence and cyclic shift, which may be a function of, for example, the RX beam at the mB, WTRU ID, cell ID, subframe number, or symbol number. The semi-static UL beam pairing resource configuration may also or alternatively include a frequency domain resource configuration, which may include, for example, a bandwidth, a starting RB location, a hopping configuration, or a transmission comb factor. A frequency domain resource may be a function of, for example, system bandwidth or WTRU density. The semi-static UL beam pairing resource configuration may also or alternatively include a time domain resource configuration, which may include, for example, a subframe, symbols within the subframe to be used for a UL beam pairing reference signal, periodicity, or a repetition factor. In one example, a base time domain resource may be configured, and a WTRU may then determine the subsequent resources by a preconfigured offset/periodicity.

One or more symbols within a subframe may be allocated for UL beam pairing reference signal transmission. For example, a WTRU may use the same transmit beam to transmit multiple UL beam pairing reference signals within one subframe.

A WTRU may transmit a UL beam pairing reference signal based on, for example, mB command or pre-configured criteria. A WTRU may receive a trigger to transmit a UL beam pairing reference signal in a number of different ways. For example, an mB may dynamically schedule a UL beam pairing reference signal transmission, with or without data in the same UL subframe. The resources for UL beam pairing reference signal transmission may be allocated similar to UL data transmission. This may provide more granularity in terms of frequency domain and time domain resources within the subframe. Multiple symbols within a subframe may be allocated for the UL beam pairing reference signal transmission. Alternatively, an mB may use just one bit field in the DCI to turn on/off the beam pairing reference signal transmission. Detailed resource allocation information may be signaled as a semi-static configuration a priori to the trigger DCI. A DCI embodiment may be used, for example, for a one-shot beam reference signal transmission.

Another example of how a WTRU may receive a trigger to transmit a UL beam pairing reference signal is use of a MAC control message for activating and deactivating a UL beam pairing reference signal transmission. Similar to DCI embodiments, the resource allocation information may be configured semi-statically. Once activated, a WTRU may transmit the UL beam pairing reference signal according to the pre-defined periodicity, until deactivated by the mB. For another example, a WTRU may receive a trigger to transmit a UL beam pairing reference signal based on a multi-beam PDCCH order or based on a random access response (RAR) following the PDCCH order that triggers a WTRU to perform multiple UL transmissions of the reference signal using multiple time multiplexed TX beams.

Another example of how a WTRU may receive a trigger to transmit a UL beam pairing reference signal is that the WTRU may be configured to transmit the UL beam pairing reference signal while in RRC connected mode. Such configuration may be provided using higher layer signaling (e.g., an RRC message or using RAR), where the RAR message may include a configuration for a subsequent UL reference signal transmission. The WTRU may stop transmitting the UL beam pairing reference signal when it leaves the connected mode.

Yet another example of how a WTRU may receive a trigger to transmit a UL beam pairing reference signal is that a WTRU may trigger the UL beam pairing reference signal based on pre-configured events. Such events may include one or more of: a number of negative acknowledgements (NACKs) for UL data transmission above a predefined threshold, a WTRU-based rotation or motion detection (e.g., via accelerometer or gyroscope) above a predefined threshold, and a change in the serving DL beam (e.g., control beam or narrow data beam). In embodiments, a WTRU may transmit a UL beam pairing request on a UL control channel based on one or more of these pre-configured events.

A WTRU may periodically transmit a UL reference signal, sweeping all the TX beams or a subset of the TX beams or may perform just one complete sweep or a one shot transmission of a subset of the TX beams. On a condition that a subset of the TX beams is used, the WTRU may either autonomously choose the subset of beams or the subset of beams to use may be specified via DCI, MAC, and/or RRC signaling. The TX beams may be identified by the UL reference signal ID or beam ID. The subset may be determined based on or more of: selecting beams that are within the spatial coverage of the current UL control channel; selecting TX beams that are associated with RX beams used for DL data channel reception where the association may be defined by the value of the steering vector or spatial proximity; based on angle of arrival (AoA) estimation at the WTRU, and based on previous aperiodic measurement results from the mB.

In embodiments, a WTRU may transmit only the narrow beams within the coverage of the current UL wide control beam used by the WTRU. In embodiments, the UL beamformed reference signal may be configured as a sounding reference signal.

An example UL resource configuration may include information regarding a start of UL resource allocation (e.g., as a pre-defined offset in terms of number of subframes or TTIs), information regarding periodicity, T (e.g., in terms of number of subframes or TTIs), a number of symbols and/or symbol numbers within each subframe allocated for UL reference signal transmission, a bandwidth and hopping configuration, a sequence number set S0 to SN, and a repetition factor. For the sequence number, the starting sequence number may be S0, and a number of sequences, N, may be derived from the starting sequence number (e.g., the number of times a UL TX beam may be transmitted before switching to a next TX beam in the sequence). For example, the starting sequence number may be a base sequence, and other sequences may be derived by cyclic shift of the base sequence. An mB may receive repetitions of the same TX beam using different RX beam.

Given the UL resource configuration, a WTRU may associate each TX beam n to a unique sequence number Sn within the sequence number set. For example, let the number of TX beams supported by a WTRU be M. If M<=N, then the WTRU may use the first M sequence numbers from the set. If M>N, then the WTRU may select N beams based on a prioritization criteria. For example, the prioritization criteria may be based on spatial proximity between the current UL control beam and the selected TX beam or may be based on WTRU-based TX beam subset selection criteria.

Starting from a first configured UL resource and a first selected beam, the WTRU may sequentially sweep each of its selected TX beams with each subsequent UL resource, where each TX beam transmission is repeated by the configured repetition factor. When the WTRU has exhausted all of its selected TX beams, a WTRU may start again from the first TX beam, each time maintaining the same order of sweep. From the mB point of view, there are just two possibilities for an upcoming UL reference signal transmission, either the sequence number next in the sequence or wrapping around to the starting sequence number. A WTRU may maintain the mapping between the sequence number and the TX beam for all the sweep operations. This mapping may be used by the mB to indicate the selected beams for subsequent data or control transmission.

In embodiments, a WTRU may dissociate or reset the mapping between the UL reference signal sequence and the TX beam in one or more of the following scenarios: when there is a change in uplink control beam; an explicit indication is provided during an uplink control beam switch procedure; there is a change in uplink data channel beam; an explicit indication is provided during an uplink data channel grant or switch procedure; when a WTRU receives a deactivation command for the UL reference signal transmission; when an explicit reset command is received to clear the mapping; and/or when a beam failure procedure or cell level monitoring procedure is triggered.

In a WTRU-based implicit reference signal sequence number to TX beam mapping, for N<M, the network and WTRU may end up in sequence number mismatch, when the UL control beam is updated or when one or more TX beams cannot be received at the mB. To handle this, a WTRU may receive a reset command from the mB to invalidate the current mapping between the reference signal sequence number and the TX beam. A WTRU may then restart the procedure and re-assign a new mapping as described above.

In embodiments, a WTRU may convey an explicit sequence number to identify the UL TX beam in addition to the UL reference signal transmission. The sequence number may be added to the UL reference signal transmission, for example, by adding a preamble to the UL transmission to identify the UL beam ID and/or assigning a beam ID to the TX beams according to WTRU implementation with the constraint that the mapping is one to one.

In other embodiments, an mB may assign a specific reference signal sequence to an upcoming WTRU UL reference signal transmission. The reference signal sequence may be signaled along with the UL resource allocation (e.g., each UL resource may be associated with a predefined reference signal sequence). For example, the DCI may grant a resource for triggering UL reference signal transmissions, at the same time providing an explicit reference signal sequence to be used for transmissions on that resource. An mB may additionally include a one bit command indicating linkage of the reference signal sequence. The linkage bit may be defined such that, if the linkage bit is 0, the WTRU may clear or reset any prior association between the specified reference signal sequence and the TX beam from the WTRU. The WTRU may consider the reference signal sequence as available or free for association with any TX beam that has no valid reference signal sequence linked to it. A WTRU may also store the linkage between the TX beam and the specified reference signal sequence. A WTRU may transmit a UL reference signal using the TX beam linked to the reference signal sequence on the UL resource. If the linkage bit is 1, the WTRU may use the UL resource to transmit a UL reference signal using the TX beam previously linked to the reference signal sequence.

In other embodiments, the reference signal sequence may be defined as a function of the radio frame number, the subframe number, the symbol, and/or the frequency resources on which the UL reference signal is transmitted. In this approach, a WTRU-specific UL reference signal sequence may be allocated, and a WTRU may use the same UL reference signal for multiple TX beams.

Alternatively, an mB-based assignment scheme may be employed for a beam ID rather than a reference signal sequence number. In one example, the reference signal sequence number may be replaced by a beam ID and, along with a linkage bit, an mB may control and coordinate the mapping between the beam ID and the WTRU TX beam.

The embodiments described with respect to UL data channel beams and pairing may also be used for UL control channel beams. In one example, the UL control channel beams may be characterized by wider spatial coverage compared to data channel beams. In some embodiments, UL reference signal transmissions for data channel beams and control channel beams may co-exist or be performed in parallel. For example, a separate set of UL resources in time and/or frequency may be reserved for transmitting a UL reference signal using candidate control channel TX beams. For another example, a separate set of reference signals may be reserved for transmitting a UL reference signal using candidate control channel TX beams. For yet another example, a non-overlapping beam ID space may be reserved for control channel beams and data channel beams.

An mB may use the UL reference signals transmitted by the WTRU to evaluate the quality of the UL TX beams. The WTRU may perform UL transmissions using the TX beam associated with the beam ID or reference signal sequence number in the UL grant. The association/mapping between the beam ID or reference signal sequence number and the TX beam ID may be determined based on implicit or explicit WTRU or mB methods, such as described above. A WTRU may perform UL data transmission using the UL control beam if the beam ID or reference signal sequence number carries a predefined or reserved value or if beam information is not present in the scheduling grant.

An mB may determine the timing advance for each WTRU TX beam during the UL reference signal transmission procedure. At least two TX beams from the WTRU may be associated with different timing advance values. A WTRU may apply timing advances to one or more TX beams based on a timing advance configuration in a MAC message or in a higher layer signaling (e.g., RRC) message. The timing advance value may be indexed by TX beam ID or UL reference signal sequence number. Alternatively, a WTRU may receive an RAR message with individual TX beam responses or may receive a block response where each TX beam may be referenced by RA-RNTI and which includes an associated timing advance and/or transmission power setting. A WTRU may apply the same timing advance value to two or more TX beams and consider them as belonging to a timing advance group. A WTRU may set the initial transmission for a multi-beam UL reference signal based on current wide beam PUSCH power. Alternatively, a WTRU may set a maximum power for UL reference signal beams and may receive closed loop feedback to ramp down the UL transmission power from the maximum power via transmit power control (TPC) bits.

A receiver in a beam paired link may use beam tracking to update its receive beam that increases the SNR during directional data transmission. A transmitter may assist the beam tracking procedure by transmitting a reference signal at predefined locations in reference to the actual data transmission. Beam tracking may be considered as open loop beam pairing as no feedback from the receiver may be required. Beam tracking may enable the receiver to choose an optimal RX beam for a given TX beam. Beam tracking may be used to compensate for rapid changes to WTRU orientation/blocking where the amount of spatial shift is small. The reference signals used for beam tracking may be referred to as beam tracking symbols. One or more beam tracking symbols may be prepended to the data channel (e.g., PDSCH or PUSCH), appended to the data channel (e.g., PDSCH or PUSCH), and/or transmitted at an offset to the data channel (e.g., PDSCH or PUSCH), where the offset could be negative or positive.

Guard periods may be introduced between beam tracking symbols and/or between beam tracking symbols and data to enable the receiver to evaluate different RX beams. During the downlink transmission, an mB may allocate one or more beam tracking symbols to assist in WTRU side RX beam tracking. Similarly, in the uplink transmission, a WTRU may transmit one or more beam tracking symbols to enable mB side RX beam tracking. Resources occupied by beam tracking symbols may be signaled using one or more of: semi-static resource allocation via RRC signaling that provides, for example, beam tracking symbol resource allocation and/or periodicity; multiple PDSCH/PUSCH formats defined to indicate presence or absence of beam tracking symbols in a given resource allocation; and explicit schedule for beam tracking symbols (e.g., start and number of beam tracking symbols) similar to the scheduling grant for data allocation. A scheduling grant in the DCI may indicate the PDSCH/PUSCH format. A predefined number of beam tracking symbols may be implicitly determined based on the PDSCH/PUSCH format.

A WTRU may monitor one or more control channel beams to receive control information in connected mode. The control channel beams may be WTRU-specific control channel beams or cell specific common control channel beams. The set of control channel beams that the WTRU may monitor may be referred to as serving control channel beams. A WTRU may be assigned one or more serving control channel beams or the WTRU may consider all the control channel beams from the mB as serving control channels. Alternatively, the WTRU may consider the control channel beams selected during idle mode operation as WTRU-specific control channel beams for connected mode operation. A WTRU may distinguish common control channel beams from the WTRU-specific control channel beams by the presence of pre-defined beam reference signals. A WTRU may utilize RX beamforming for additional antenna gain to improve reliability of the DL control channel. Thus, a notion of a beam pair may be established between the WTRU and mB. The WTRU-specific search space may be a function of, for example, a number of control channel beams transmitted by the mB, a number of control channels selected by and/or assigned to the WTRU, beam specific control region size/duration, overall control region duration, bandwidth of the cell, aggregation levels, WTRU ID, subframe number, or subframe. The WTRU-specific search space may be defined as the union of the beam specific search space of all serving control channel beams selected by, or assigned, to the WTRU.

While in connected mode, a WTRU may evaluate the suitability of non-serving control channel beams from the serving cell. The quality of the serving control channel beam may be determined not only by the transmit beam at the mB but also by the receive beam at the WTRU. The WTRU may provide feedback to the mB based on the evaluation.

Based on the WTRU feedback, the mB may determine the serving control channel beam to serve the WTRU based on one or more of the quality of the control channel beam conditioned upon receive beamforming at the WTRU, a number of WTRUs within the control channel beam and the capacity of the control channel, interference of the control channel beam with other co-existing beams from the serving mB, interference of the serving control channel beam on the neighbor cell, and interference of a neighbor cell control channel on the WTRU receive beam.

An mB may indicate a new serving control channel beam using RRC signaling or DCI-based signaling. In another embodiment, the WTRU may autonomously select the preferred control channel beam using one or more of the criteria described above. The WTRU may obtain assistance information from the serving mB to evaluate and select the serving control channel beam. Such assistance information may include, for example, a bias or offset value that implicitly indicates the capacity of the control channel, the inter-mB interference and/or a BRS threshold to consider the control channel beam for selection.

The beam switch command from the mB may include one or more of an identity for the new control channel beam (explicit or explicit by BRS sequence number or function of cell ID), beamformed data channels associated with the new control channel beam, configuration of the search space associated with the new control channel beam, resources for UL beamforming (e.g., dedicated RACH preambles and/or time/frequency resources), fallback TTIs associated with the target control channel beam, a beam specific PCFICH associated with the target control channel beam, resources for transmitting a beam switch ACK (e.g., dedicated PRACH resources with optional repetition or beamformed UL PUCCH channel), and/or a UL control channel beam associated with the target control channel beam. The UL control beam from the WTRU may be identified by the reference signal sequence ID. In embodiments, the search space and control channel may be semi-static and may be configured by the SIB. Upon receiving the beam switch command, the WTRU may read the SIB associated with the control channel beam to determine the new search space. The search space configuration may also include control channel beam to symbol mapping information.

Upon receiving a beam switch command to transition from a source control channel beam to a target control channel beam, a WTRU may: switch its receive beam associated with the target control channel beam that results in a better signal quality metric for the target control channel beam; update the control channel search space according to the received configuration; add, modify or delete the serving control channel beam or beams and apply the TTI or symbol mapping for the serving control channel beam (such update may be effective at a preconfigured offset from the current TTI); monitor cell specific control channel beams in pre-configured locations and WTRU specific control channels in all other times/locations; stop monitoring the source control channel beam and ignore any pending scheduling grants received on the source control channel beam; update the UL control channel to the PUCCH configuration; and/or apply the target DL control channel configuration and start monitoring the target control beam, for example, using the new BRS to determine the presence of the target control channel beam.

On a condition that dedicated random access resources are configured, a WTRU may: transmit the dedicated random access preambles on the preconfigured RACH resources (possibly multiple times according to the configured repetition factor); perform RACH using one or more UL beams corresponding to the configured target DL control channel beam; and/or receive an RAR including the preferred UL beam, which may be identified by a preamble IE or an RA-RNTI. The WTRU may use the selected UL beam for ACK/NACK/CSI feedback. The WTRU may additionally receive an updated timing advance corresponding to the new UL transmit beam.

If no random access resources are configured, the WTRU may assume that UL beam information is available at the mB, and the WTRU may transmit a beam switch ACK on the PUCCH resources. In embodiments, the WTRU may transmit the ACK on the preconfigured UL control beam. The timing relation between the beam switch command and the UL ACK may be either predefined or explicitly configured by the beam switch command. In embodiments, the WTRU may be configured with exactly one UL control beam, even if multiple DL control channels are allocated, and the WTRU may transmit the ACK on the configured UL control beam irrespective of the DL beam carrying data.

A WTRU may not reset the MAC/RLC context if the target DL beam configuration is associated with the same serving mB. Additionally, for beam switches between different mBs, different levels of layer 2 (L2) reset may be configured at the WTRU. For example, the WTRU may be transparent to whether the beam switch happens with the same mB, between different mBs of the same cell, or between different mBs of different cells or clusters. But from the network point of view, different beam switches may lead to different levels of L2 reset. A WTRU may be configured to reset just the hybrid automatic repeat request (HARQ) context but retain all the ARQ context (e.g., sequence numbers) or reset both the HARQ and ARQ contexts.

Occasionally a WTRU may not receive the beam switch command from the mB, or a measurement report to the mB may be lost, for example, due to abrupt degradation in the serving control channel beam quality. Such rapid degradation may be attributed to, for example, dynamic blockage or changes in WTRU orientation. In embodiments, a WTRU may enter an extended monitoring mode and monitor one or more control channel beams in addition to the current serving control channel beam. The extended monitoring mode may provide additional opportunity for the mB to reach the WTRU and coordinate a beam switch procedure to recover the radio link.

A WTRU may use a proactive extended monitoring procedure to temporarily increase its beam search space when there is a sudden degradation in the serving control beam quality. The terms beam re-establishment and beam recovery may be used interchangeably herein. The beam pairs before and after beam re-establishment may be the same or different.

Figure 11:
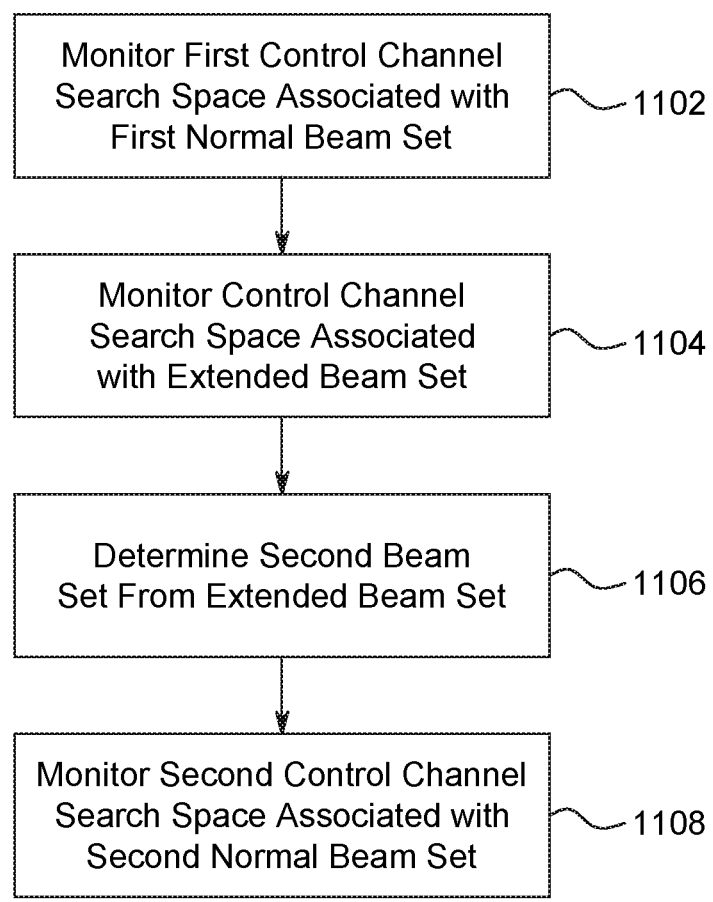
FIG. 11 is a flow diagram of an example method for extended monitoring implemented in a WTRU.

FIG. 11 is a flow diagram 1100 of an example method for extended monitoring implemented in a WTRU. In the example illustrated in FIG. 11, a WTRU may monitor a first control channel search space (SS) associated with a first normal beam set (1102). The first normal beam set may include a first beam set. The WTRU may monitor a control search space associated with an extended beam set (1104). The WTRU may perform the monitoring the control search space associated with the extended beam set upon initiating and/or entering an extended monitoring mode, for example, subsequent to a trigger based on a measurement by the WTRU. The trigger may be received, for example, from an mB. The extended beam set may include the first beam set and one or more additional beam sets.

The WTRU may determine a second beam set from the extended beam set (1106). The determination may be based, for example, on a received control channel beam switch command or based on an SS in which a beam switch command is received. The WTRU may monitor a second control channel SS associated with a second normal beam set (1108). The second normal beam set may include the determined second beam set.

In embodiments, a WTRU may enter extended monitoring based on one or more criteria, which may be preconfigured. Such criteria may include, for example, one or more serving control beam beamformed reference signal received power (BRSRP) going below a threshold, one or more non-serving control beam BRSRP going above a threshold, and/or a predefined offset from the transmission of a measurement report triggered based on the BRSRP going above or below the threshold being reached. The BRSRP may, for example, be measured over the beamformed reference signal associated with the control beam of the non-serving control beam, linked PBCH and/or SYNC beam. In both cases, the threshold may be absolute or relative to one or more other beams in the cell. In addition, or alternatively, the criteria for the WTRU entering extended monitoring may include the running counter for NACKs or CRC failures becoming greater than a predefined value.

In extended monitoring mode, a WTRU may consider a number of different candidate beams for monitoring in the extended beam set, in addition to the first beam set. Such candidate beams may include, for example, one or more of: all the control channel beams and/or common control channel beams in the serving cell; one or more control beams or common control channel beams that are spatially adjacent the current serving control channel beam (e.g., beams that are immediately left and right of a serving control channel beam); a subset of control beams or common control channel beams that are explicitly linked or preconfigured to be associated with the serving control channel beam; one or more control beams or common control channel beams with a quality above a threshold (e.g., BRSRP threshold described above); one or more control beams or common control channel beams included in the most recent measurement report; and one or more WTRU-specific control channel beams that are configured as backup beams or candidate beams for extended monitoring.

The WTRU may monitor one or more of the additional beams, in extended monitoring mode, in one or more TTIs and/or subframes, such as: all subsequent downlink TTIs and/or subframes while the WTRU is in extended monitoring mode; preconfigured TTIs and/or subframes configured specifically for extended mode monitoring; all subsequent TTIs and/or subframes in which the candidate control channel beams are transmitted; and/or TTIs and/or subframes that carry broadcast signaling, such as PBCH and/or SYNC signals. A WTRU may be configured with a specific control channel beam mapping within one or more of these TTIs and/or subframes. Additionally, the WTRU may be configured with specific search spaces and/or DCIs reserved for beam switch control messages.

In embodiments, paging messages may be used as a beam-re-establishment and/or beam switch mechanism. A WTRU may monitor paging messages in all of the candidate beams during extended monitoring mode. The paging type may indicate the reason as beam re-establishment and/or beam switch. CRNTI may be used as the WTRU identity, and additional dedicated resources may be allocated to trigger UL response transmissions from the WTRU.

In embodiments, a WTRU may explicitly indicate entry into extended monitoring mode by transmitting a NACK on predefined reserved resources, which may be preconfigured on the serving control beams or backup control beams. Alternatively, a WTRU may transmit RACH on preconfigured resources to indicate entry into extended monitoring mode.

In embodiments, a WTRU may indicate preferred beams and an explicit WTRU ID to restore the radio link. One or more RACH preambles or preamble groups and/or time/ frequency resources may be preconfigured to implicitly indicate, for example, one or more of a cause for the RACH transmission (e.g., re-establishment, serving control beam below a threshold, and/or resource request for measurement report), entry into extended monitoring mode, and/or preferred set of beams.

A WTRU may exit extended monitoring mode when one or more conditions are met. Such conditions may include, for example, receipt of a beam switch command in the serving, backup, or other common control beam, and/or not receiving DL DCI and a beam switch command within a predefined time from the start of extended monitoring mode. Upon exiting the extended monitoring mode, a WTRU may perform cell level monitoring or declare radio link failure (RLF).

Figure 12:
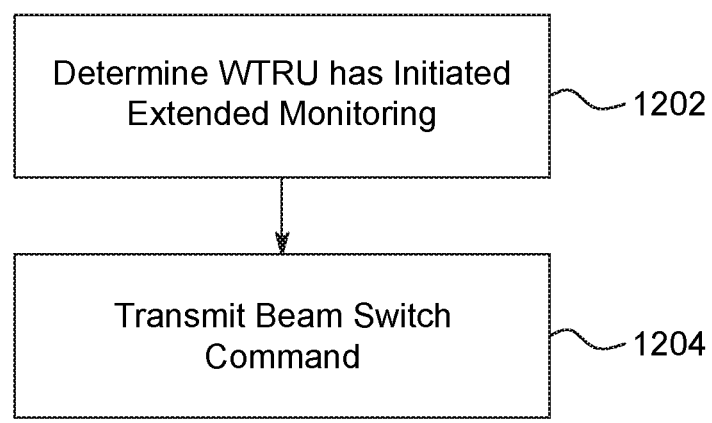
FIG. 12 is a flow diagram of an example method for extended monitoring implemented in a base station, such as a millimeter wave base station (mB)

FIG. 12 is a flow diagram 1200 of an example method for extended monitoring implemented in a base station, such as an mB. In the example illustrated in FIG. 12, the base station may determine that the WTRU has initiated extended monitoring (1202), and, on a condition that the base station determines that the WTRU has initiated extended monitoring, transmit a beam switch command (1204). In embodiments, the WTRU initiating extended monitoring may include, for example, switching from monitoring a first control channel SS associated with a first normal beam set including a first beam set to monitoring a control channel SS associated with an extended beam set including the first beam set and one or more additional beam sets subsequent to a trigger based on a measurement. The beam switch command may be a command for the WTRU to switch to monitoring a second control channel SS associated with a second normal beam set including a second beam set.

In embodiments, an mB may implicitly or explicitly determine that the WTRU has entered into extended monitoring mode. The mB may implicitly determine that the WTRU has entered into the extended monitoring mode based on an absence of acknowledgement for a scheduled downlink transmission or an absence of a UL data transmission in response to a UL grant. The mB may explicitly determine that the WTRU has entered into the extended monitoring mode based on an absence of a response to a status query message, a poll request message, a PDCCH order or other message. Such explicit request/response may be faster than implicit methods and may be resource efficient.

To perform beam level monitoring, a WTRU may perform BRS measurements on the PBCH beam linked to the serving control channel beam. The transmission schedule of the PBCH beam, such as periodicity and location in the frame structure, may be predefined. The WTRU may additionally, or alternatively, perform BRS measurements on the common control channel beam linked to the serving control channel beam. The transmission schedule of the common control channel beam, such as periodicity and location in the frame structure, may be preconfigured. The WTRU may additionally, or alternatively, perform opportunistic BRS measurements on the serving control channel beam.

The outcome of beam level monitoring may be the average of BRSRP measurements over a predefined time period. The average BRSRP value may indicate the serving control channel beam quality. For purposes of beam level monitoring, in-sync and out-of-sync states may be defined based on measured BRSRP values. A WTRU may determine beam level failure based on one or more criteria, such as BRSRP measurements going below a pre-defined threshold and N successive out-of-sync indications being received.

On a condition that the WTRU determines beam level failure, it may enter extended monitoring mode and perform actions specified as a part of the extended monitoring procedure. Additionally or alternatively, the WTRU may start to monitor normal and/or fallback DCI in all (or subset of) the control channel beams in a subset of TTIs including fallback TTIs. Additionally or alternatively, a WTRU may determine loss of DL beam and may consequently suspend all UL transmissions, including ACK/NACK feedback and pending UL transmissions, which may include measurement reports, higher layer feedback (e.g., RLC ARQ), buffer status reports and/or any other higher layer data. Additionally or alternatively, beam level failure may trigger a WTRU to perform cell level monitoring.

In embodiments, a WTRU may perform cell level monitoring by performing BRS measurements on all the PBCH beams in the current serving cell. Here, the transmission schedule of the PBCH beam, such as periodicity and location in the frame structure, may be predefined. Additionally or alternatively, a WTRU may perform cell level monitoring by performing BRS measurements on all the common control channel beams in the current serving cell. Here, the transmission schedule of a common control channel beam, such as periodicity and location in the frame structure, may be preconfigured. Additionally or alternatively, a WTRU may perform cell level monitoring by performing BRS measurements on all the control channel beams in the current serving cell. Here, for example, periodicity and location in the frame structure may be preconfigured, such as in fallback TTIs and/or subframes.

In embodiments, a WTRU may perform cell level monitoring upon beam level failure or, alternatively, whenever the WTRU enters connected mode. In other embodiments, a WTRU may perform cell level monitoring all the time, including in idle mode.

If, during cell level monitoring, a WTRU finds a suitable beam, it may trigger a beam re-establishment or beam switch procedure. The beam re-establishment or beam switch procedure may include, for example, performing a RACH procedure to inform the mB of the need to switch the beam using, for example, predefined RACH resources for the beam re-establishment or beam switch. Additionally, or alternatively, the beam re-establishment or beam switch procedure may include, for example, using a grant received in an RAR to transmit a higher layer message indicating beam re-establishment or beam switch by including an old-RNTI or measurement report for one or more control channels. If, during cell level monitoring, no suitable beam is found, such as when the higher layers receive Qout on all of the control channel beams in the cell, a WTRU may trigger RLF procedures, such as performing cell selection and RRC re-establishment.

Figure 13A:
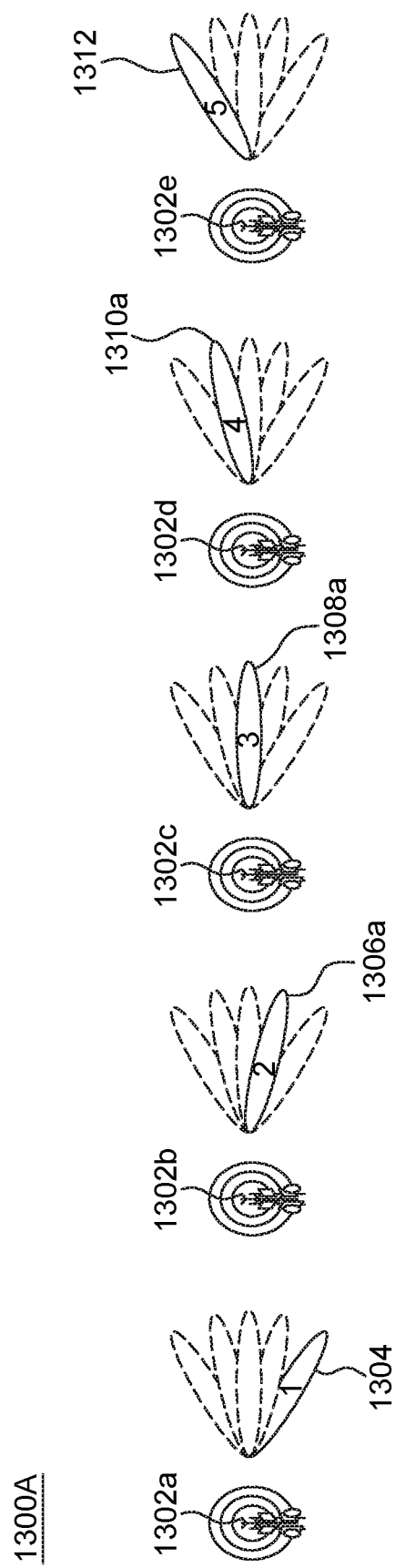
FIGS. 13A and 13B are diagrams 1300A and 1300B of a more specific example of extended monitoring.
Figure 13B:
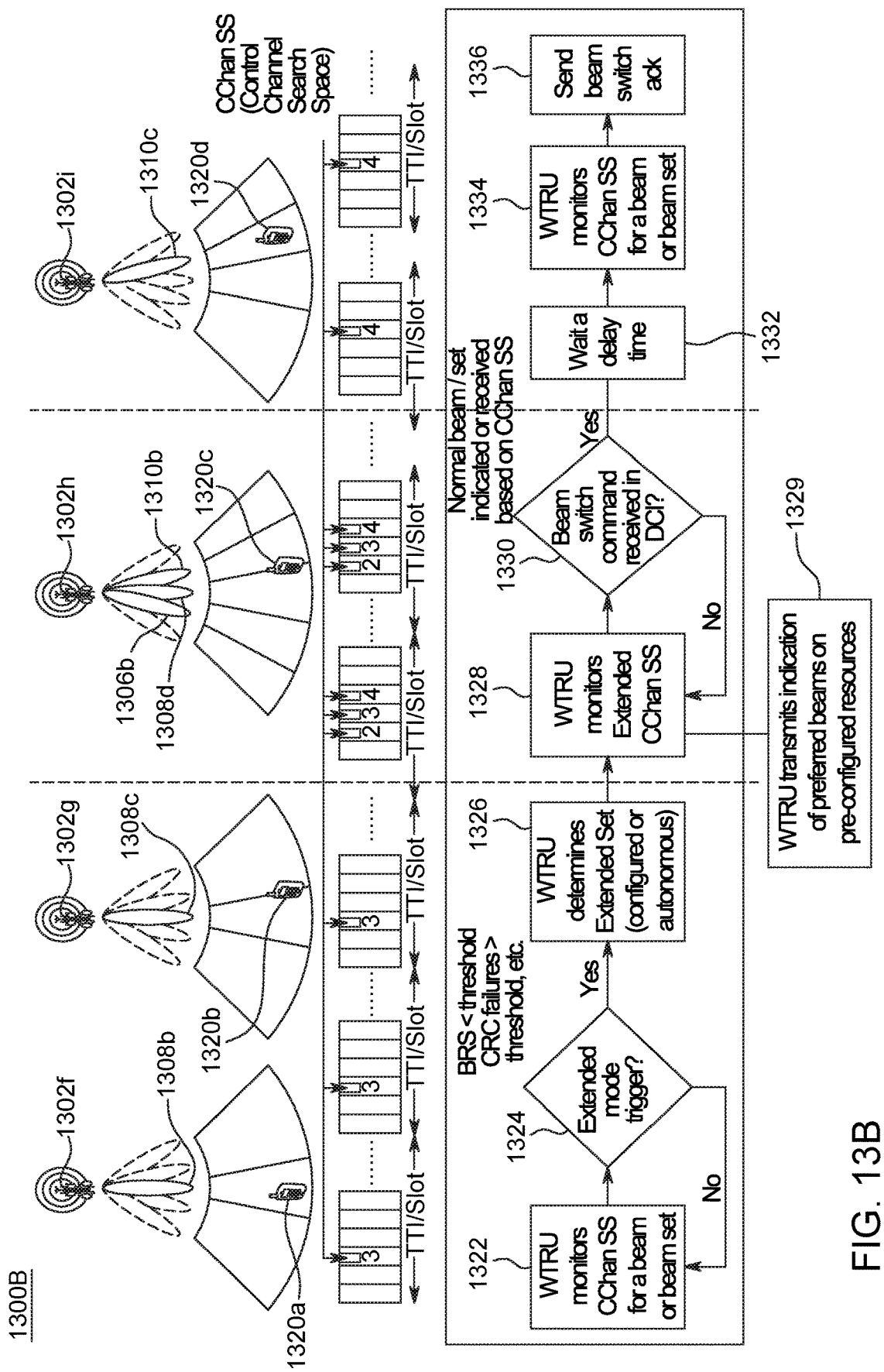

FIGS. 13A and 13B are diagrams 1300A and 1300B of a more specific example of extended monitoring. In the example illustrated in FIG. 13A, an mB 1302 sweeps control channel beams 1304, 1306, 1308, 1310 and 1312 in sequence. In the example illustrated in FIG. 13B, a WTRU 1320a monitors a control channel search space associated with control channel beam 1308b (1322). The WTRU 1320 may then determine whether extended mode has been triggered (1324). On a condition that extended mode is not triggered, the WTRU may continue monitoring the original control channel search space for a beam or a beam set (1322). In the example illustrated in FIG. 13B, the WTRU 1320b has moved such that it may no longer be able to receive control channel beam 1308c and, therefore, determines that the extended mode is triggered.

On a condition that the WTRU 1320 enters extended mode, the WTRU 1320 determines an extended set of control channel beams to monitor (1326) and monitors the extended set (1328) for a beam switch command. In the example illustrated in FIG. 13B, the WTRU 1320c monitors the extended set, which includes the original serving control channel beam 1308d and the immediately adjacent beams 1306b and 1308d. The WTRU 1320 may also transmit an indication of preferred beams on pre-configured resources. On a condition that the beam switch command is not received, the WTRU continues monitoring the extended set (1328). On a condition that a beam switch command is received, the WTRU 1320 monitors a new control channel search space, which includes one or more control channel beams (1334). In the example illustrated in FIG. 13B, the new control channel search space includes the new serving control channel beam 1310c. In embodiments, the WTRU 1320 may optionally wait a delay time (1332) before monitoring the new control channel search space (1334). In embodiments, the WTRU 1320 may optionally send a beam switch ACK (1336) on a condition that the WTRU 1320 receives the beam switch command.

In at least some embodiments described herein, mB, SCmB, mmW eNB, eNB, cell, small cell, Pcell, Scell may be used interchangeably. Further, in at least some embodiments, operate may be used interchangeably with transmit and/or receive. Further, in at least some embodiments, component carrier and mmW carrier may be used interchangeably with serving cell.

In embodiments, the mB may transmit and/or receive one or more mmW channels and/or signals in a licensed band and/or unlicensed band. In at least some embodiments, the WTRU may be substituted for the eNB and/or vice versa. Further, in at least some embodiments UL may be substituted for DL and vice versa.

In at least some embodiments, a channel may refer to a frequency band, which may have a center or carrier frequency and a bandwidth. Licensed and/or unlicensed spectrum may include one or more channels, which may or may not overlap. Channel, frequency channel, wireless channel, and mmW channel may be used interchangeably. Accessing a channel may be the same as using (e.g., transmitting on, receiving on and/or using) the channel.

In at least some embodiments, a channel may refer to an mmW channel or signal such as an uplink or downlink physical channel or signal. Downlink channels and signals may include one or more of mmW synchronization signals, mmW broadcast channels, mmW cell reference signals, mmW beam reference signals, mmW beam control channels, mmW beam data channels, mmW hybrid ARQ indicator channels, mmW demodulation reference signals, primary synchronization signals (PSS), secondary synchronization signals (SSS), demodulation reference signals (DMRS), cell-specific reference signals (CRS), CSI-RS, PBCH, PDCCH, PHICH, EPDCCH, and/or PDSCH. Uplink channels and signals may include one or more of mmW PRACH, mmW control channel, mmW data channel, mmW beam reference signal, mmW demodulation reference signal, PRACH, PUCCH, SRS, DMRS and PUSCH. Channel and mmW channel may be used interchangeably. Channels and signals may be used interchangeably.

In at least some embodiments, data/control may mean data and/or control signals and/or channels. Control may include synchronization. The data/control may be mmW data/control. Data/control and data/control channels and/or signals may be used interchangeably. Channels and signals may be used interchangeably. Control channel, control channel beam, PDCCH, mPDCCH, mmW PDCCH, mmW control channel, directional PDCCH, beamformed control channel, spatial control channel, and control channel slice, high frequency control channel may be used interchangeably. Data channel, data channel beam, PDSCH, mPDSCH, mmW PDSCH, mmW data channel, directional PDSCH, beamformed data channel, spatial data channel, data channel slice, high frequency data channel may be used interchangeably.

In at least some embodiments, channel resources may be resources (e.g., 3GPP LTE or LTE-A resources), such as time, frequency, code and/or spatial resources, which may, for example, at least sometimes carry one or more channels and/or signals. In at least some embodiments, channel resources may be used interchangeably with channels and/or signals.

mmW beam reference signal, mmW reference resource for beam measurement, mmW measurement reference signal, mmW channel state measurement reference signal, mmW demodulation reference signal, mmW sounding reference signal, reference signal, CSI-RS, CRS, DM-RS, DRS, measurement reference signal, reference resource for measurement, CSI-IM, and measurement RS may be used interchangeably. mmW cell, mmW small cell, SCell, secondary cell, license-assisted cell, unlicensed cell, and LAA cell may be used interchangeably. mmW cell, mmW small cell, PCell, primary cell, LTE cell, and licensed cell may be used interchangeably. Interference and interference plus noise may be used interchangeably.

A WTRU may determine the UL and/or DL directions of one or more subframes according to one or more received and/or configured TDD UL/DL configurations. UL/DL and UL-DL may be used interchangeably.

Embodiments described herein may be applicable to any system irrespective of frequency bands, usage (e.g., licensed, unlicensed, shared), antenna configuration (e.g., phased array, patch or horn), RF configuration (e.g., single or multiple RF chains), beamforming methods used (e.g., digital, analog, hybrid, codebook based or otherwise), deployments (e.g., macro, small cell, heterogeneous networks, dual connectivity, remote radio heads, or carrier aggregation). In some embodiments mmW may be substituted for cmW or LTE/LTE-A/LTE evolution, LTE-Advanced, or LTE-AdvancedPro.

In at least some embodiments, a scheduling interval may refer to the subframe, slot, frame, schedulable slice, control channel periodicity or any other pre-defined time unit. Gaps, guard periods, silence periods, switching periods, absence of transmission or DTX periods may be used interchangeably.

Antenna pattern, phase weights, steering vector, codebook, precoding, radiation pattern, beam pattern, beam, beam width, beamformed transmission, antenna port, virtual antenna port, or transmission associated with a specific reference signal, directional transmission, or spatial channel may be used interchangeably.

In embodiments described herein, a radiation pattern may refer to the angular distribution of the radiated electromagnetic field or power level in the far field region. Further, in embodiments, a beam may refer to one of the lobes, such as the main, side, and/or grating lobes of the transmit radiation pattern and receive gain pattern of an antenna array ([ ]). A beam may also denote a spatial direction that may be represented with a beamforming weight vector. A beam may be identified or associated with a reference signal, an antenna port, a beam identity (ID), and/or a scrambling sequence number and may be transmitted and/or received at a specific time, frequency, code and/or spatial resources. A beam may be formed digitally, in an analog manner or both (e.g., hybrid beamforming). The analog beamforming may be based on fixed code-book or continuous phase shifting. A beam may also include Omni-directional or Quasi-Omni-directional transmission. Two beams may be differentiated by the direction of highest radiated power and/or by beam width.

In embodiments, a data channel beam may be used to transmit a data channel, a data channel beam, a PDSCH, an mPDSCH, a mmW PDSCH, an mmW data channel, a directional PDSCH, a beamformed data channel, a spatial data channel, a data channel slice or a high frequency data channel. A data channel beam may be identified or associated with a reference signal, an antenna port, a beam identity (ID), a scrambling sequence number or a data channel number and may be transmitted and/or received at a specific time, frequency, doe and/or spatial resource.

In embodiments, a control channel beam may be used to transmit a control channel, a PDCCH, an mPDCCH, am mmW PDCCH, an mmW control channel, a directional PDCCH, a beamformed control channel, a spatial control channel, a control channel slice or a high frequency control channel. The control channel may carry DCI for one or more users. The control channel may also carry the PHICH and PCFICH in the downlink and PUCCH in the uplink. A control channel beam may be identified or associated with a reference signal, an antenna port, a beam identity (ID), a scrambling sequence number, or a control channel number and may be transmitted and/or received at a specific time, frequency, code and/or spatial resource. A control channel beam may be cell-specific or WTRU-specific.

In embodiments, common control channel beam may refer to a control channel beam that may be used to carry control information related to broadcast or multicast information, such as SI, paging, and/or beam switch commands.

In embodiments, half power beam width (HPBW) may refer to, in a radiation pattern cut containing the direction of the maximum of a lobe, the angle between two directions in which the radiation intensity is one-half the maximum value. The exact beam width for the beamformed control/data channel may not be specified and may depend on mB or WTRU implementation. An mB may support WTRUs with varying capabilities and vice versa.

In embodiments, control channel beam duration may refer to a number of OFDM symbols in a scheduling interval occupied by one control channel beam. A control region may be the number of OFDM symbols in a scheduling interval occupied by all the control channel beams transmitted in the scheduling interval.

In embodiments, fixed codebook-based analogue beamforming may refer to a grid of beams that may include or consist of a set of fixed beams. Each beam may be formed by applying a beamforming weight vector v chosen from a pre-defined codebook $v \in \{v_1, v_2, v_3 \ldots v_N\}$ where N denotes the number of fixed beams. The number of beams may depend on the HPBW of the beamforming and desired coverage.

In embodiments, continuous phase shifting analog beamforming may refer to the desired weight of each phase shifter calculated based on the estimated channel information (e.g., angular information converted using a high resolution digital-to-analogue converter (DAC) to apply to the phase shifter). It may provide a continuous and adaptive beamforming to track channel conditions.

In embodiments, an antenna port may be defined such that the channel over which a symbol on the antenna port is conveyed may be inferred from the channel over which another symbol on the same antenna port is conveyed. There may be one resource grid per antenna port.

In embodiments, linkage may refer to a pre-defined offset between two channel and/or beams. The linkage may be used to determine transmission schedule, time, frequency location of one channel and/or beam when the time and/or frequency location of another channel/beam is known.

In embodiments, BRSRP may be defined as the average power received by the WTRU from the beam specific reference signal resource element associated with a control channel beam. In embodiments, cell, 5G cell, mmW cell, transmission point and cluster may be used interchangeably.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor; and
a transceiver,
wherein the WTRU is configured with a first set of beams for use for radio link quality measurements,
wherein the WTRU is further configured with a second set of beams for use for radio link quality measurements when a radio link quality of all beams of the first set of beams is below a first threshold,
wherein the processor and the transceiver are configured to monitor a first control channel search space using at least one beam of the first set of beams,
wherein the processor and the transceiver are further configured to evaluate a radio link quality of the second set of beams based on a radio link quality of all beams of the first set of beams being below the first threshold,
wherein the processor and the transceiver are further configured to identify at least one beam of the second set of beams that has a radio link quality above a second threshold, and
wherein the processor and the transceiver are further configured to monitor a second control channel search space using the at least one beam of the second set of beams.

2. The WTRU of claim 1, wherein the processor and the transceiver are further configured to transmit, on configured random access channel (RACH) resources, based on the radio link quality of the one or more beams of the first set of beams being below the first threshold.

3. The WTRU of claim 1, wherein the first control channel search space and the second control channel search space are physical downlink control channel (PDCCH) search spaces.

4. The WTRU of claim 1, wherein the processor and the transceiver are further configured to evaluate the radio link quality of the second set of beams by performing measurements associated with a physical broadcast channel (PBCH) of beams of the second set of beams.

5. The WTRU of claim 1, wherein the at least one beam of the first set of beams and beams of the second set of beams are each associated with a unique reference signal.

6. The WTRU of claim 1, wherein the processor and the transceiver are further configured to indicate preferred beams of the second set of beams and an explicit WTRU ID.

7. The WTRU of claim 1, wherein the processor and the transceiver are further configured to monitor the second control channel search space using the at least one beam of the second set of beams until the WTRU receives a beam switch command.

8. The WTRU of claim 1, wherein the first threshold and the second threshold are the same.

9. The WTRU of claim 1, wherein the first threshold and the second threshold are different.

10. A method comprising:
a wireless transmit/receive unit (WTRU), which is configured with a first set of beams for use for radio link quality measurements and configured with a second set of beams for use for radio link quality measurements when a radio link quality of all beams of the first set of beams is below a first threshold, monitoring a first control channel search space using at least one beam of the first set of beams,
evaluating a radio link quality of the second set of beams based on a radio link quality of all beams of the first set of beams being below a first threshold;
identifying at least one beam of the second set of beams that has a radio link quality above a second threshold; and
monitoring a second control channel search space using the at least one beam of the second set of beams.

11. The method of claim 10, further comprising transmitting, on configured random access channel (RACH) resources, based on the radio link quality of the one or more beams of the first set of beams being below the first threshold.

12. The method of claim 10, wherein the first control channel search space and the second control channel search space are physical downlink control channel (PDCCH) search spaces.

13. The method of claim 10, wherein the evaluating the radio link quality of the second set of beams further comprises evaluating the radio link quality of the second set of beams by performing measurements associated with a physical broadcast channel (PBCH) of beams of the second set of beams.

14. The method of claim 10, wherein the at least one beam of the first set of beams and beams of the second set of beams are each associated with a unique reference signal.

15. The method of claim 10, wherein the processor and the transceiver are further configured to indicate preferred beams of the second set of beams and an explicit WTRU ID.

16. The method of claim 10, further comprising monitoring the second control channel search space using the at least one one beam of the second set of beams until the WTRU receives a beam switch command.

17. The method of claim 10, wherein the first threshold and the second threshold are the same.

18. The method of claim 10, wherein the first threshold and the second threshold are different.

* * * * *

UNITED STATES PATENT AND TRADEMARK OFFICE
CERTIFICATE OF CORRECTION

PATENT NO. : 11,394,447 B2
APPLICATION NO. : 16/081491
DATED : July 19, 2022
INVENTOR(S) : Deenoo et al.

It is certified that error appears in the above-identified patent and that said Letters Patent is hereby corrected as shown below:

In the Claims

At Column 32, Line 30, after the word "below" delete "a" and insert therefor --the--.

Signed and Sealed this
Twentieth Day of September, 2022

*Katherine Kelly Vidal*

Katherine Kelly Vidal
*Director of the United States Patent and Trademark Office*